(12) United States Patent
Ichida et al.

(10) Patent No.: US 7,291,079 B2
(45) Date of Patent: Nov. 6, 2007

(54) MOTORIZED FRONT DERAILLEUR ASSEMBLY WITH SAVER ARRANGEMENT

(75) Inventors: Tadashi Ichida, Ikoma (JP); Kazuhiro Fujii, Kawachinagano (JP)

(73) Assignee: Shimano Inc., Osaka (JP)

( * ) Notice: Subject to any disclaimer, the term of this patent is extended or adjusted under 35 U.S.C. 154(b) by 710 days.

(21) Appl. No.: 10/786,233

(22) Filed: Feb. 26, 2004

(65) Prior Publication Data

US 2005/0192139 A1    Sep. 1, 2005

(51) Int. Cl.
*F16H 61/00*    (2006.01)

(52) U.S. Cl. .......................................................... 474/80

(58) Field of Classification Search ................. 474/78, 474/79, 80, 81, 82, 83
See application file for complete search history.

(56) References Cited

U.S. PATENT DOCUMENTS

| | | | |
|---|---|---|---|
| 3,919,891 A | 11/1975 | Stuhlmuller et al. | |
| 4,078,444 A | 3/1978 | Huret | |
| 4,237,743 A * | 12/1980 | Nagano | 474/82 |
| 5,213,548 A | 5/1993 | Colbert et al. | |
| 5,514,041 A | 5/1996 | Hsu | |
| 5,518,456 A * | 5/1996 | Kojima et al. | 474/77 |
| 5,577,969 A | 11/1996 | Watarai | |
| 5,676,616 A * | 10/1997 | Hara | 474/144 |
| 5,681,234 A | 10/1997 | Ethington | |
| 5,860,880 A | 1/1999 | Oka | |
| 5,873,283 A | 2/1999 | Chen et al. | |
| 6,277,044 B1 | 8/2001 | Fujimoto | |
| 6,282,976 B1 | 9/2001 | Jordan et al. | |
| 6,293,882 B1 * | 9/2001 | Kitamura et al. | 474/80 |
| 6,619,154 B2 | 9/2003 | Campagnolo | |
| 6,623,389 B1 * | 9/2003 | Campagnolo | 474/70 |
| 6,629,574 B2 | 10/2003 | Turner | |
| 6,648,782 B2 | 11/2003 | Valle | |
| 6,679,797 B2 | 1/2004 | Valle | |
| 6,767,308 B2 | 7/2004 | Kitamura | |
| 6,979,009 B2 * | 12/2005 | Ichida et al. | 280/238 |
| 2002/0061797 A1 | 5/2002 | Valle | |
| 2002/0190173 A1 | 12/2002 | Fujii | |
| 2003/0022744 A1 | 1/2003 | Tsai et al. | |
| 2003/0092519 A1 | 5/2003 | Fukuda | |
| 2004/0063528 A1 | 4/2004 | Campagnolo | |
| 2004/0115962 A1 | 6/2004 | Kitamura et al. | |

FOREIGN PATENT DOCUMENTS

| | | |
|---|---|---|
| DE | 4340471 C1 | 2/1995 |
| EP | 1010613 A1 | 6/2000 |
| EP | 1310423 A2 | 5/2003 |
| EP | 1357023 A1 | 10/2003 |
| WO | WO-97/07919 | 3/1997 |

* cited by examiner

*Primary Examiner*—Vicky A. Johnson
(74) *Attorney, Agent, or Firm*—Global IP Counselors, LLP

(57) ABSTRACT

A motorized bicycle front derailleur assembly is provided with an arrangement to protect the motor in the event the chain guide is stuck in one of the shift positions. The motorized bicycle front derailleur assembly has a motor unit, a front derailleur and a motor linkage. The motor unit has an output shaft that rotates between first and second rotational positions. The front derailleur includes a fixing body, a chain guide, and a derailleur linkage operatively coupled between the fixing body and the chain guide. The motor linkage is operatively coupled to the output shaft and the front derailleur linkage to move the chain guide in response to rotation of the output shaft. The motor linkage includes a jamming protection arrangement that is configured and arranged to move between a force transmitting state and a force override state.

21 Claims, 23 Drawing Sheets

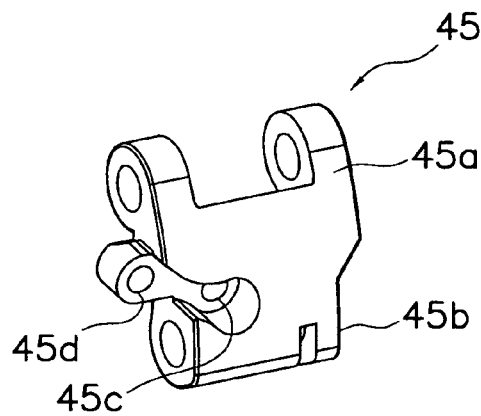 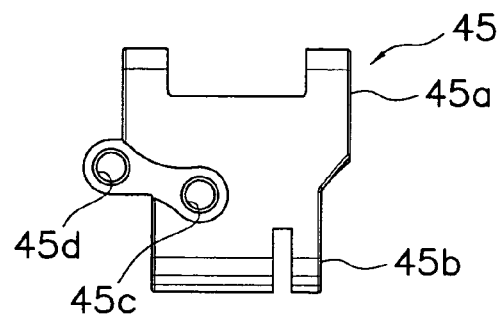
Fig. 19        Fig. 20
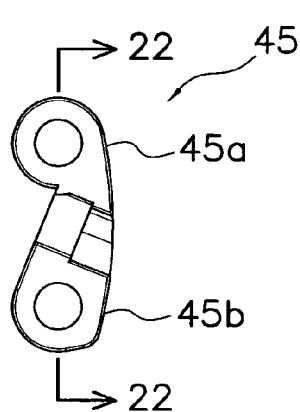 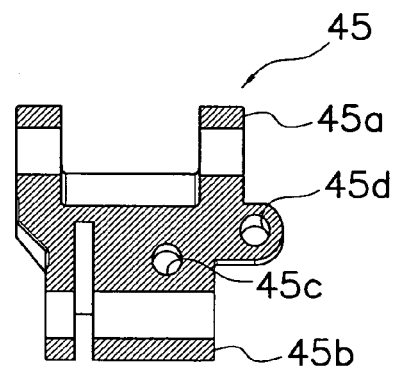
Fig. 21        Fig. 22

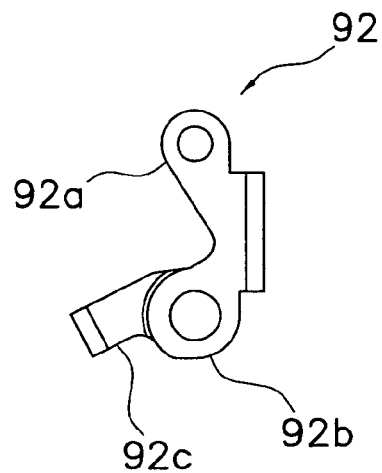 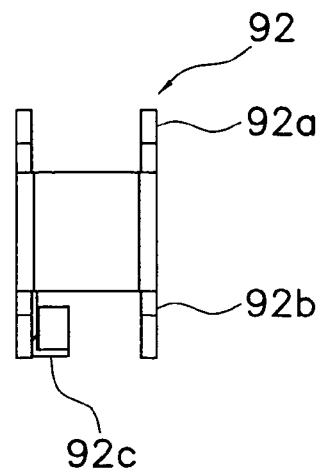 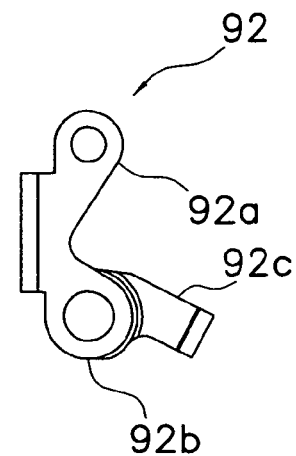
*Fig. 26*  *Fig. 27*  *Fig. 28*
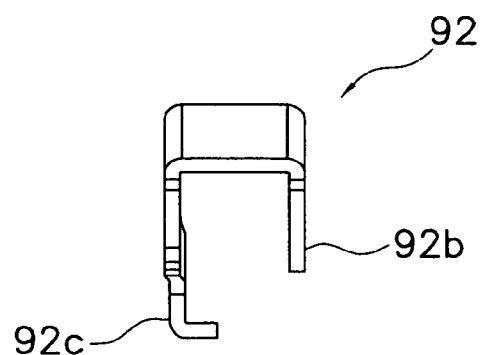
*Fig. 29*

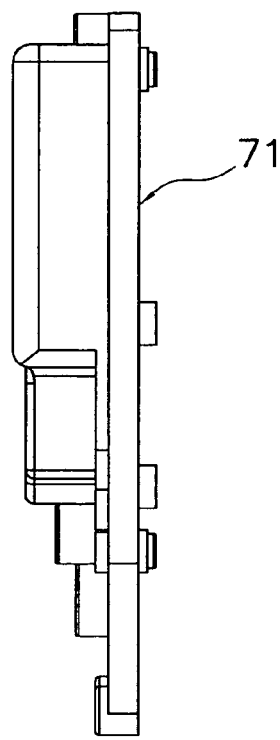 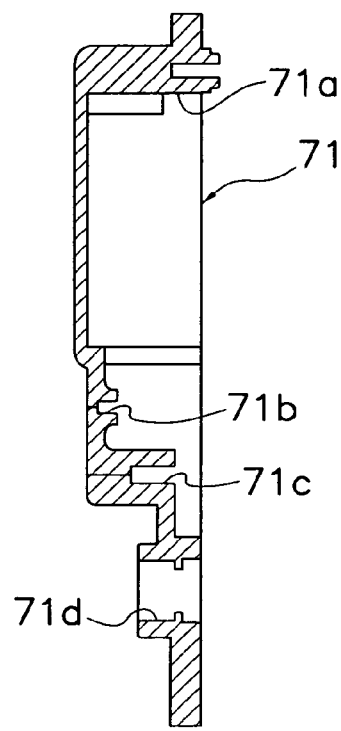
Fig. 41    Fig. 42
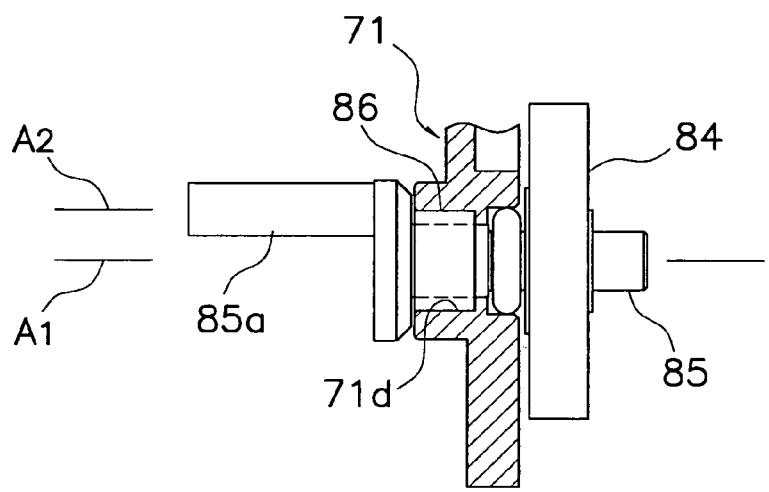
Fig. 43

MOTORIZED FRONT DERAILLEUR ASSEMBLY WITH SAVER ARRANGEMENT

BACKGROUND OF THE INVENTION

1. Field of the Invention

This invention generally relates to a motorized bicycle derailleur. More specifically, the present invention relates to a motorized bicycle derailleur that includes an arrangement to protect the motor in the event the chain guide is stuck in one of the shift positions.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Recently, bicycles have been equipped with electrical components to make riding easier and more enjoyable for the rider. Some bicycles are equipped with automatic shifting units that are automatically adjusted according to the riding conditions by a cycle computer or control unit. In particular, the front and rear derailleurs have recently been automated.

Generally speaking, the front derailleur is typically secured to the seat tube of the bicycle frame or the bottom bracket. Basically, a front derailleur includes a fixed or base member non-movably secured to a bicycle frame, and a movable member supported to be movable relative to the fixed member. Typically, the fixed member is a tubular clamping member that is secured to the seat tube. The movable member typically has a chain guide with a pair of cage plates for contacting and moving a chain between the front sprockets. The movable member is usually biased in a given direction relative to the fixed member by a spring. The movable member is usually moved relative to the fixed member by pulling and/or releasing a shift control cable that is coupled to the front derailleur. The movable member and the fixed member usually are interconnected through pivotal links. In a manually operated front derailleur, a control cable is connected to one of the pivotal links to apply a torque thereto, thereby causing the links to move the movable section. The control cable is fixed to the link in such a position that an operating force applied to the control cable. This force on the cable is converted into a link swinging torque. In a motorized front derailleur, a motor is used to pull and release a control cable or the motor is connected by a drive train to the front derailleur.

It will be apparent to those skilled in the art from this disclosure that there exists a need for an improved motorized bicycle front derailleur assembly. This invention addresses this need in the art as well as other needs, which will become apparent to those skilled in the art from this disclosure.

SUMMARY OF THE INVENTION

One object of the present invention is to provide a motorized bicycle front derailleur assembly that includes an arrangement to protect the motor in the event the chain guide is stuck in one of the shift positions.

Another object of the present invention is to provide a motorized bicycle front derailleur assembly, which is reliable.

Another object of the present invention is to provide motorized bicycle front derailleur assembly that is configured and arranged to be easily adjusted.

Another object of the present invention is to provide a motorized bicycle front derailleur assembly that is relatively simple and inexpensive to manufacture and assemble.

The foregoing objects can basically be attained by providing a motorized bicycle front derailleur assembly comprising a motor unit, a front derailleur, and a motor linkage. The motor unit has an output shaft being configured and arranged to rotate between a first rotational position and a second rotational position. The front derailleur is operatively coupled to the output shaft. The front derailleur includes a fixing body, a chain guide, and a derailleur linkage operatively coupled between the fixing body and the chain guide. The motor linkage is operatively coupled to the output shaft and the front derailleur linkage to move the chain guide in response to rotation of the output shaft. The motor linkage includes a jamming protection arrangement that is configured and arranged to move between a force transmitting state and a force override state.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 19 is a side perspective view of the right or outer link for the front derailleur illustrated in FIGS. 1-11 in accordance with the present invention;

FIG. 20 is a right side elevational view of the right link illustrated in FIG. 19;

FIG. 21 is a rear side elevational view of the right link illustrated in FIGS. 19 and 20;

FIG. 22 is a cross-sectional view of the right link illustrated in FIGS. 19-21 as seen along section line 22-22 of FIG. 21;

FIG. 26 is a side elevational view of a saver link for the front derailleur illustrated in FIGS. 1-11 in accordance with the present invention;

FIG. 27 is a side elevational view of the saver link illustrated in FIG. 26;

FIG. 28 is an inside elevational view of the saver link illustrated in FIGS. 26 and 27;

FIG. 29 is a bottom elevational view of the saver link illustrated in FIGS. 26-28 in accordance with the present invention;

FIG. 41 is a side elevational view of the casing or housing illustrated in FIGS. 39 and 40 for the front derailleur motor unit;

FIG. 42 is a cross-sectional view of the casing or housing illustrated in FIGS. 39-41 for the front derailleur motor unit as seen along section line 42-42 of FIG. 39;

FIG. 43 is an enlarged, partial cross-sectional view of the lower portion of the casing or housing of the front derailleur motor unit having the output shaft and the output shaft gear attached thereto;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
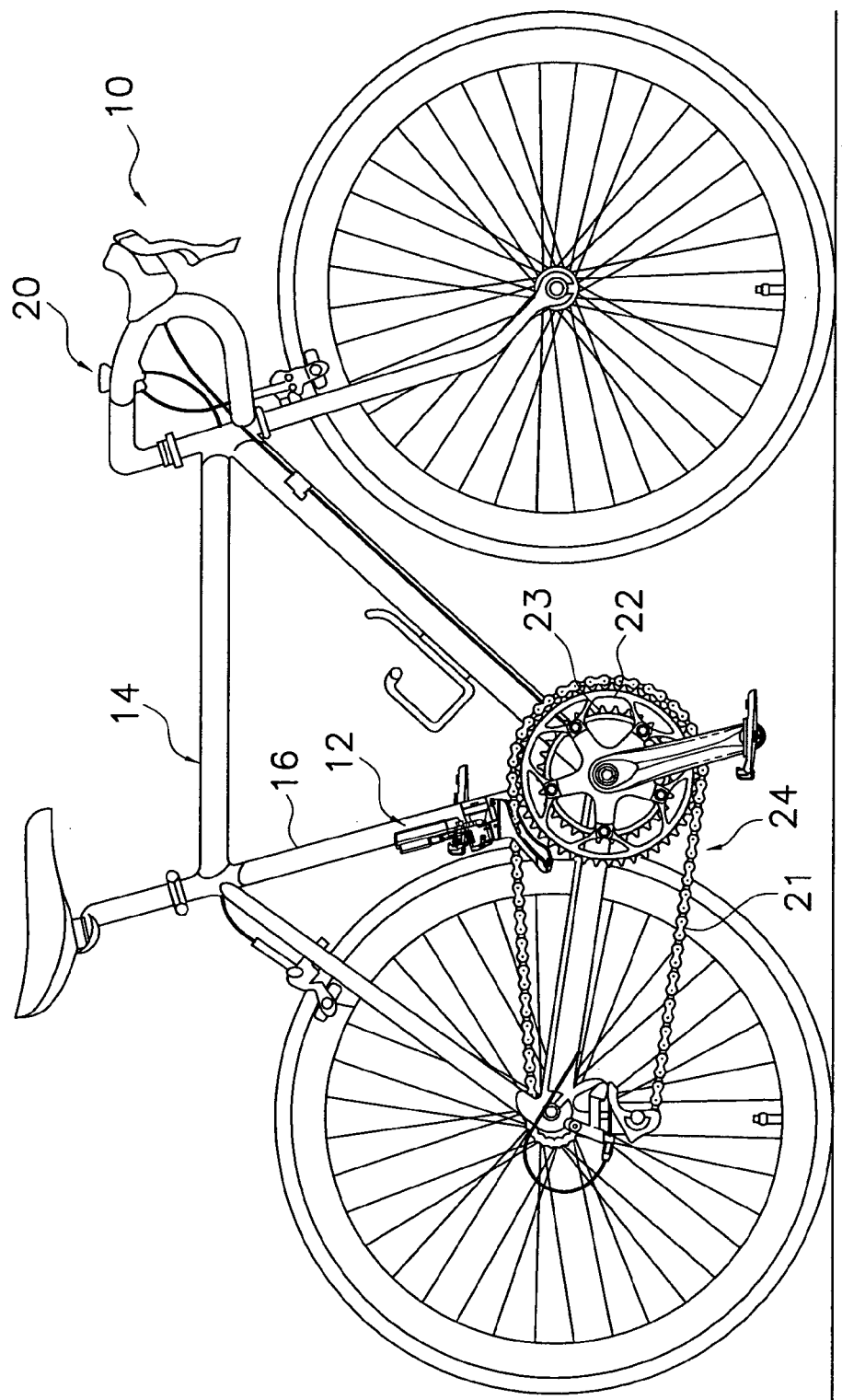
FIG. 1 is a side elevational view of a bicycle equipped with a motorized front derailleur assembly in accordance with the present invention.
Figure 2:
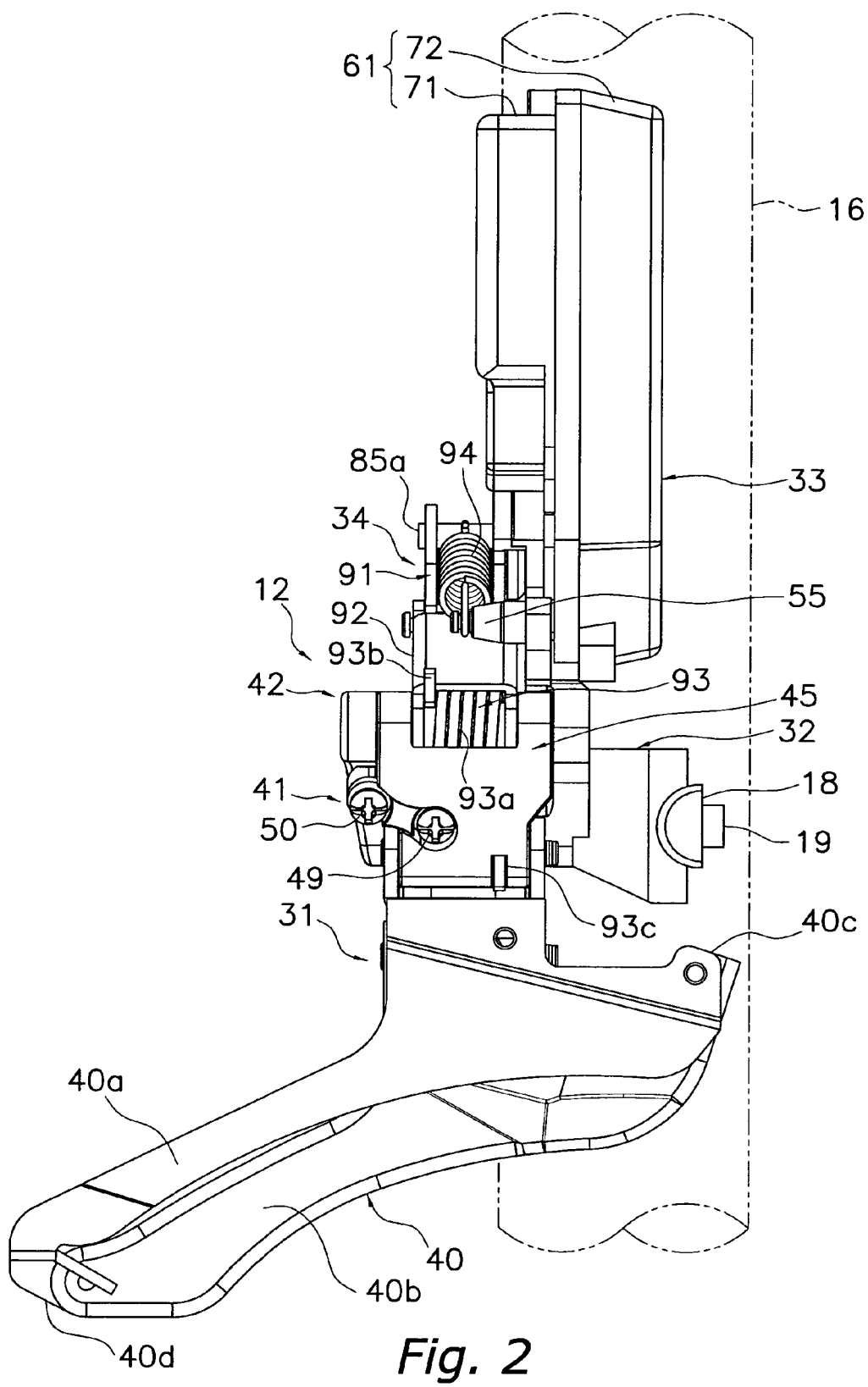
FIG. 2 is an enlarged side elevational view of the motorized front derailleur illustrated in FIG. 1 in a low shift position.
Figure 3:
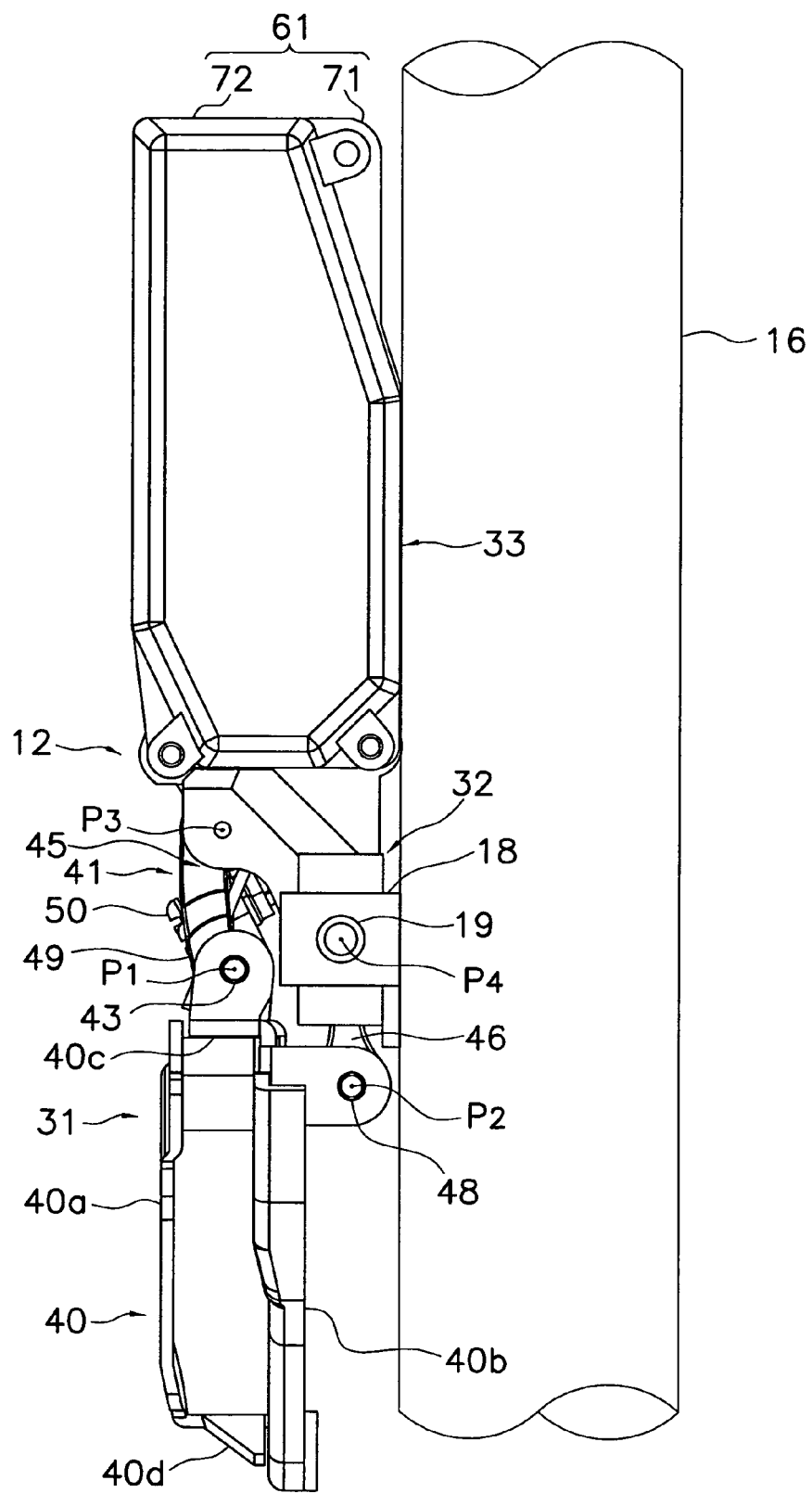
FIG. 3 is an enlarged, front elevational view of the motorized front derailleur illustrated in FIGS. 1 and 2 in the low shift position.
Figure 4:
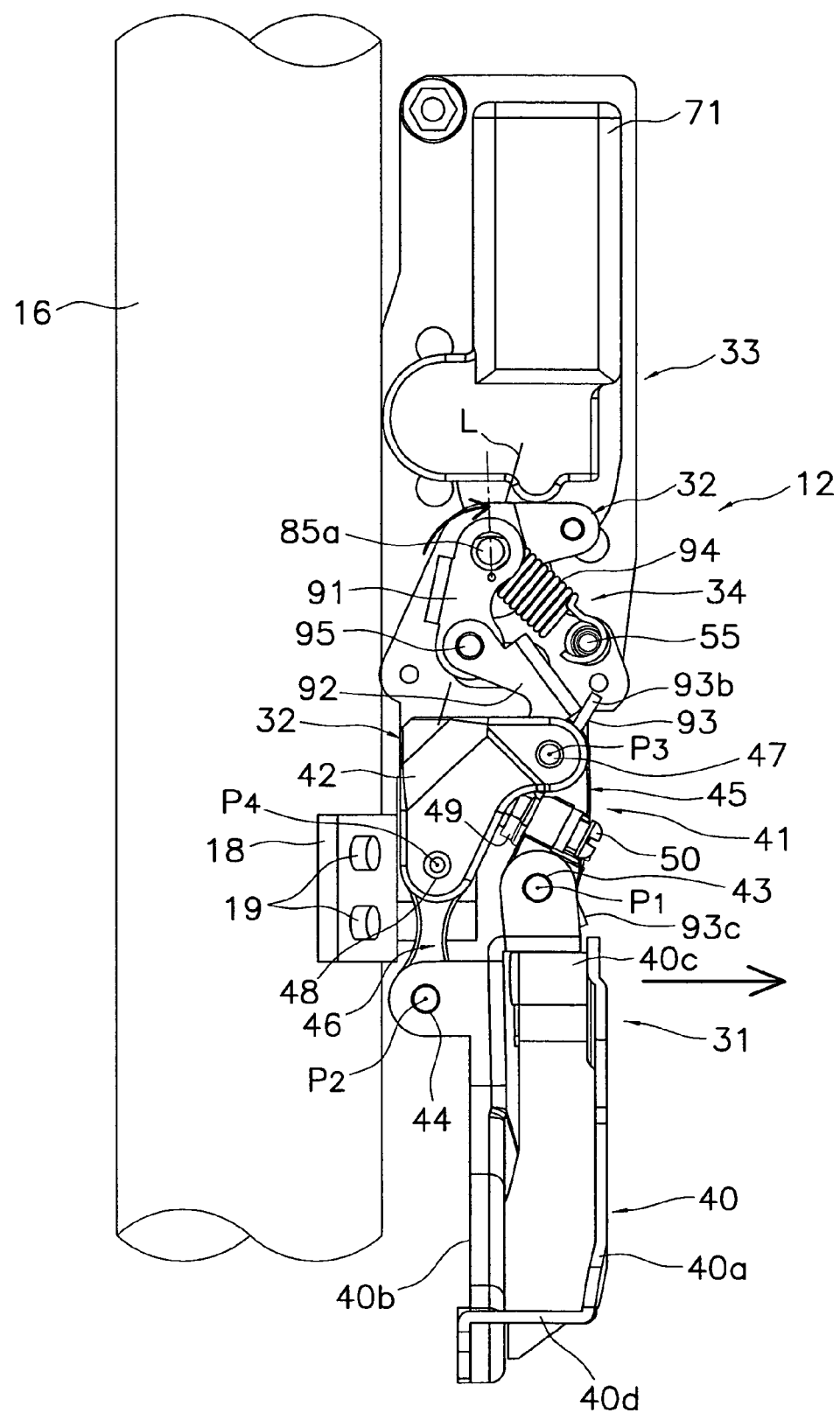
FIG. 4 is an enlarged, rear elevational view of the motorized front derailleur illustrated in FIGS. 1-3 in the low position.
Figure 5:
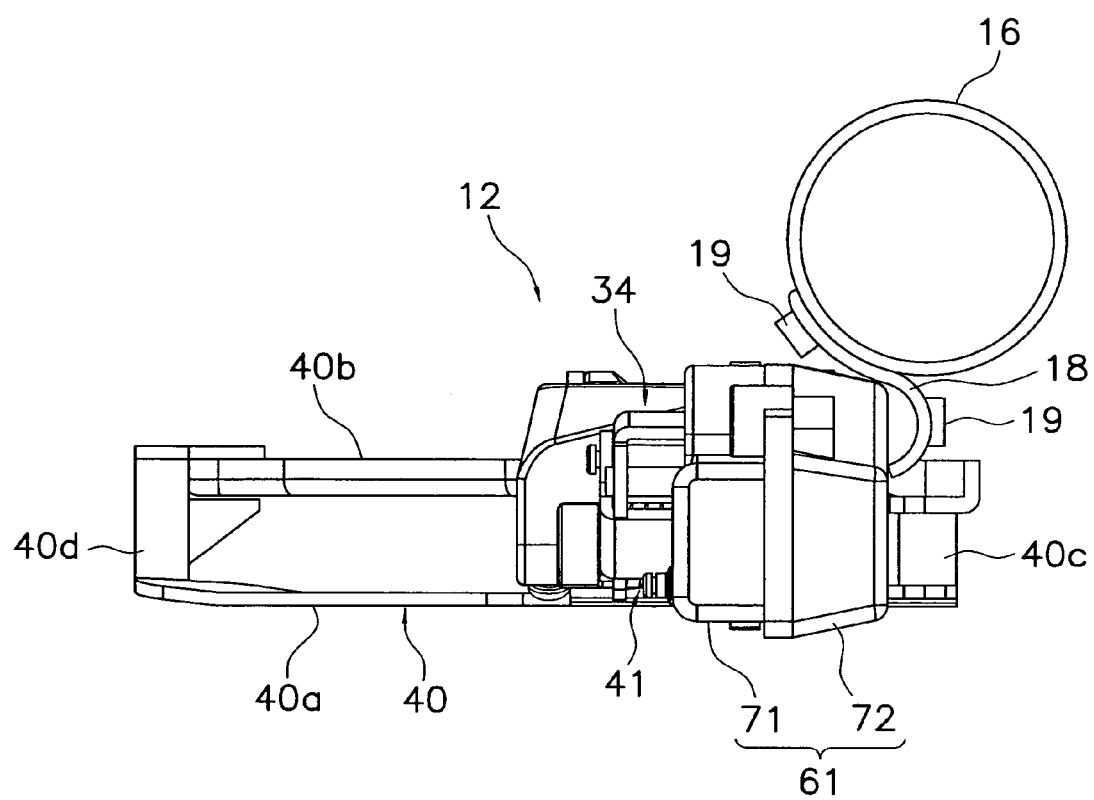
FIG. 5 is a top plan view of the motorized rear derailleur illustrated in FIGS. 1-4 in the low shift position.
Figure 6:
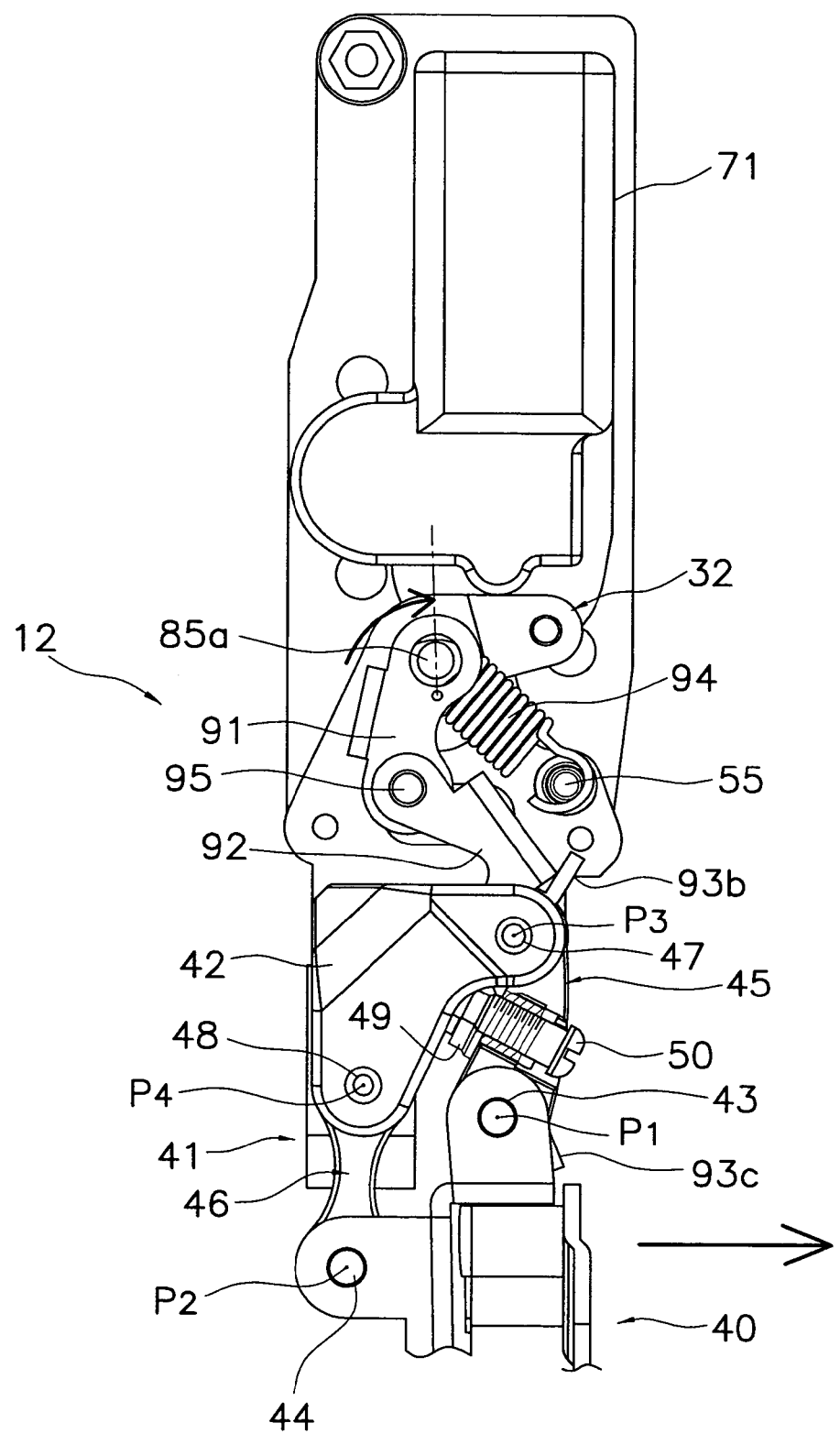
FIG. 6 is a partial rear elevational view of the motorized rear derailleur illustrated in FIGS. 1-5, with a portion of the fixing body broken away for purposes of illustration.
Figure 7:
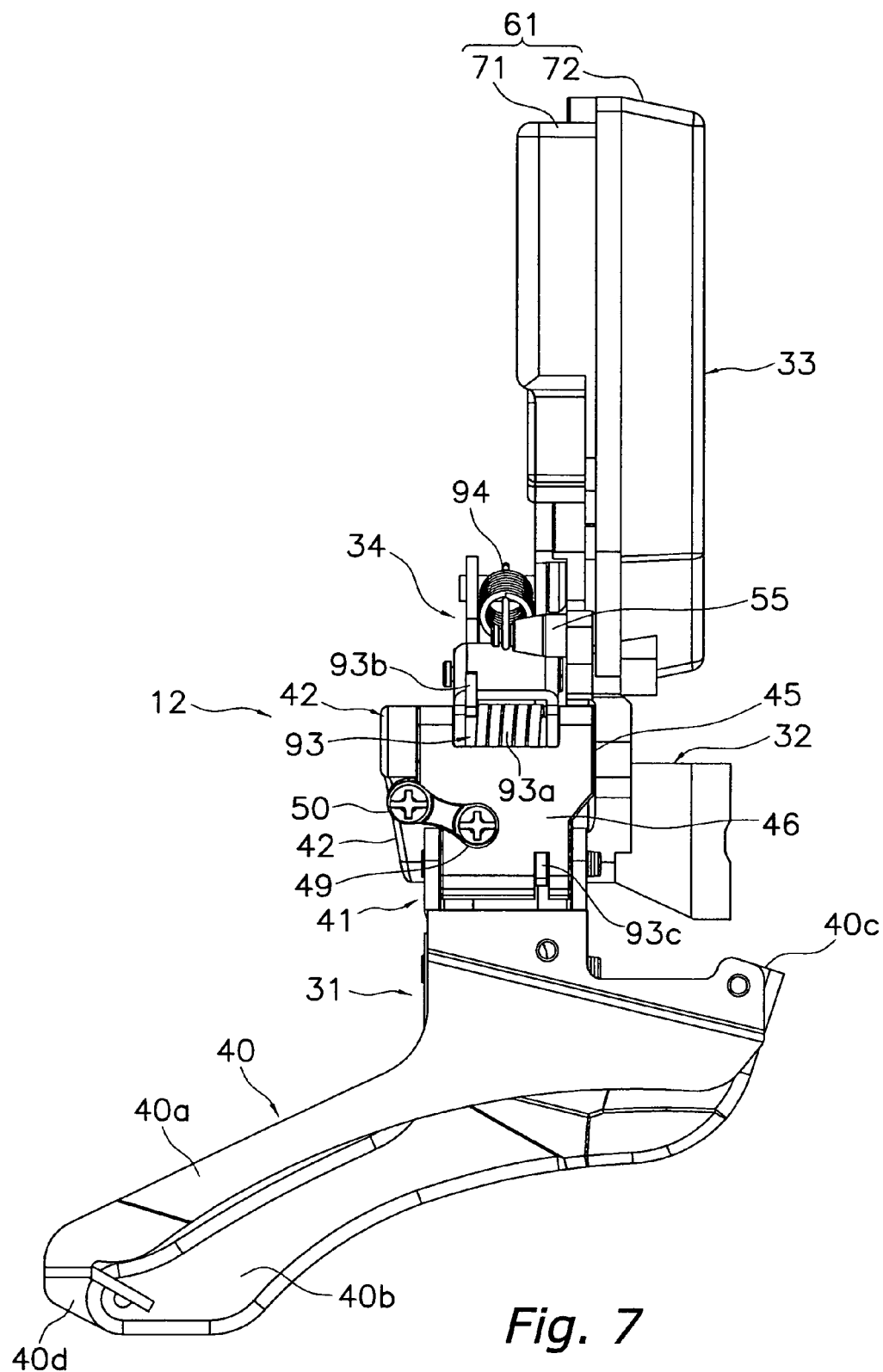
FIG. 7 is a side elevational view of the motorized front derailleur in the top shift position.

Referring initially to FIG. 1, a bicycle 10 is illustrated that is equipped with a motorized front derailleur assembly 12 in accordance with a first embodiment of the present invention. The bicycle 10 further includes a bicycle frame 14 having a seat tube 16 with the motorized front derailleur assembly 12 mounted to the seat tube 16 by a bracket 18 and fasteners or bolts 19 as seen in FIGS. 1-5. The front derailleur 12 is operated in a conventional manner by an electronic shifting unit 20 coupled to an electrical control device via an electric shift cable to move a chain 21 between at least two front sprockets or chain wheels 22 and 23 of the bicycle drive train 24. Each control device is preferably provided with a pair of shift buttons that are operatively coupled to the electronic shifting unit 20, preferably in accordance with U.S. Pat. No. 6,073,730 (assigned to Shimano, Inc.) and U.S. Pat. No. 6,212,078 (assigned to Shimano, Inc.).

Since these parts of bicycle 10 are well known in the art, these parts will not be discussed or illustrated in detail herein, except as they are modified to be used in conjunction with the present invention. Moreover, various conventional bicycle parts, which are not illustrated and/or discussed herein, can also be used in conjunction with the present invention.

The motorized front derailleur assembly 12 basically includes a motorized front derailleur unit 31, a motorized front derailleur mounting member 32, a front derailleur motor unit 33 and a motor linkage 34. The motorized front derailleur unit 31, the front derailleur motor unit 33 and the motor linkage 34 are all mounted on the motorized front derailleur mounting member 32 that is configured and arranged to fixedly couple the motorized derailleur assembly 12 to the seat tube 16 of the bicycle frame 14.

Figure 10:
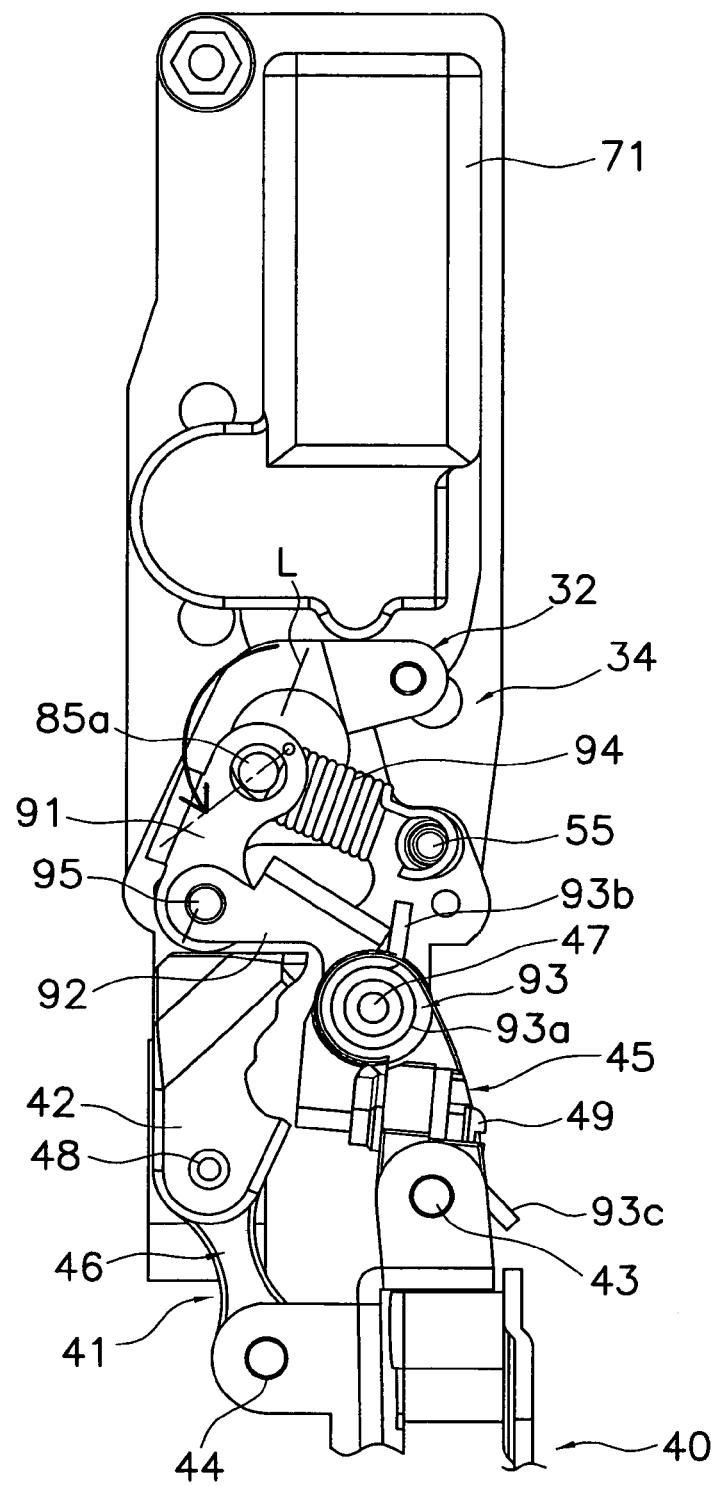
FIG. 10 is a partial, rear elevational view of the rear derailleur with a portion of the fixing body broken away for purposes of illustration.
Figure 11:
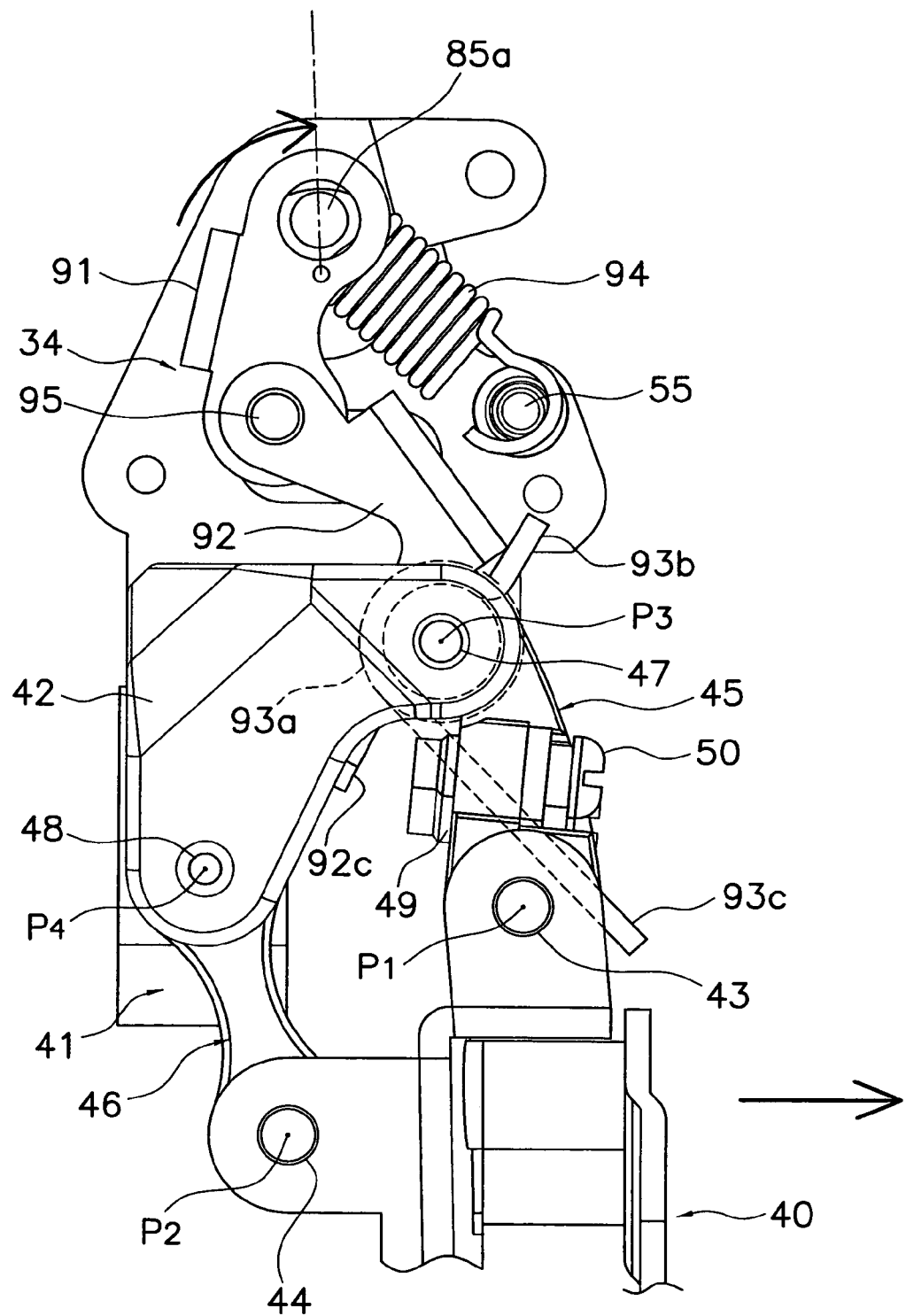
FIG. 11 is a partial, rear elevational view of the motorized front derailleur having the motor linkage in a low position and the derailleur linkage being held such that the chain guide remains in a top position.
Figure 12:
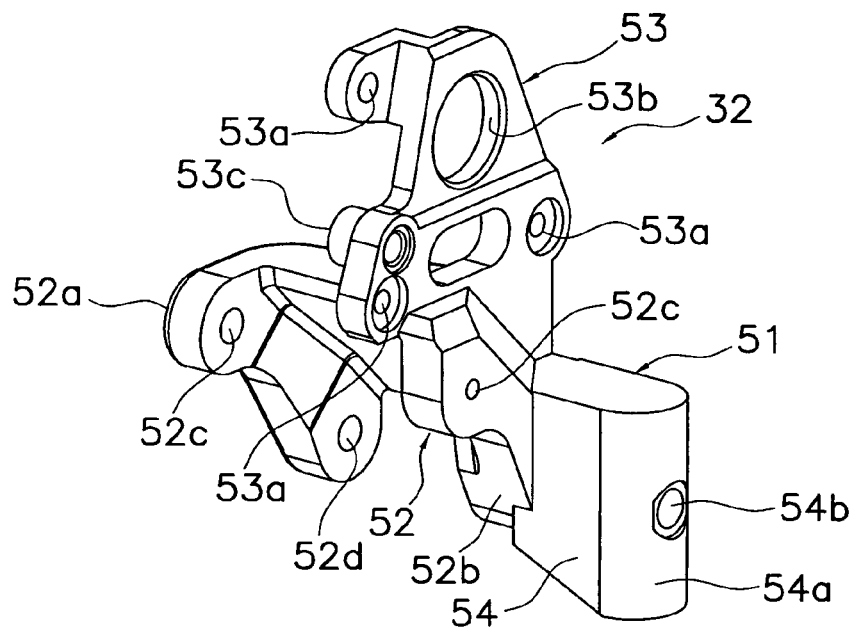
FIG. 12 is a front perspective view of the motorized front derailleur mounting member for the front derailleur illustrated in FIGS. 1-11 in accordance with the present invention.
Figure 13:
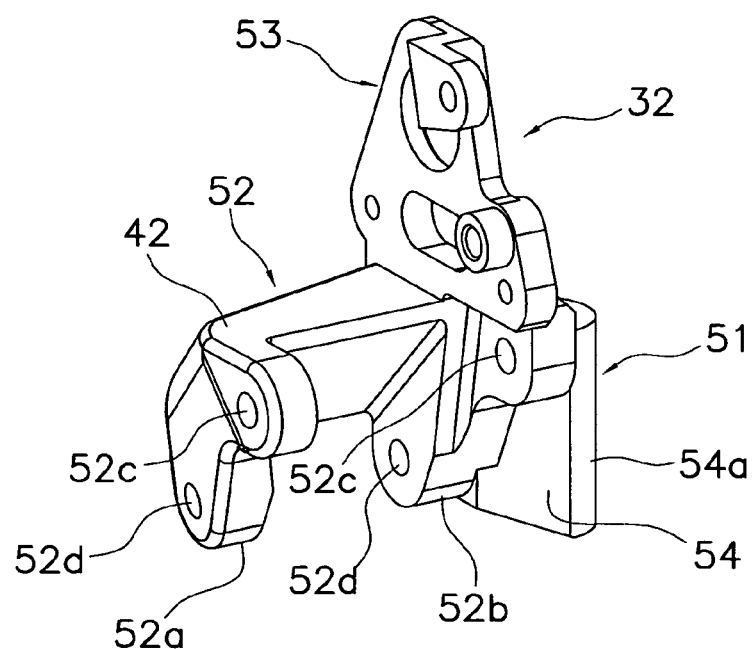
FIG. 13 is a rear perspective view of the motorized front derailleur mounting member illustrated in FIG. 12.
Figure 14:
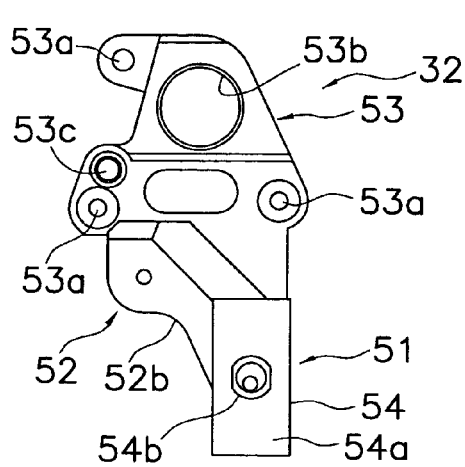
FIG. 14 is a front elevational view of the motorized front derailleur mounting member illustrated in FIGS. 12 and 13.
Figure 15:
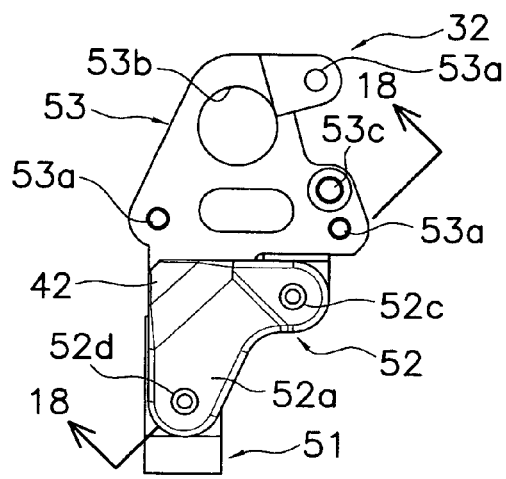
FIG. 15 is a rear elevational view of the motorized front derailleur mounting member illustrated in FIGS. 12-14.
Figure 16:
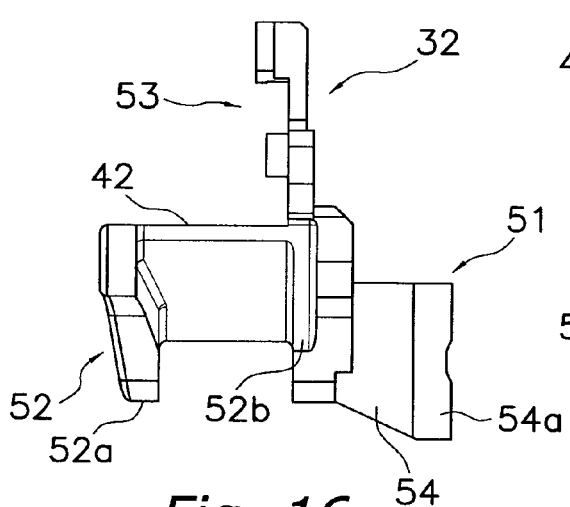
FIG. 16 is a right side elevational view of motorized front derailleur mounting member illustrated in FIGS. 12-15.
Figure 17:
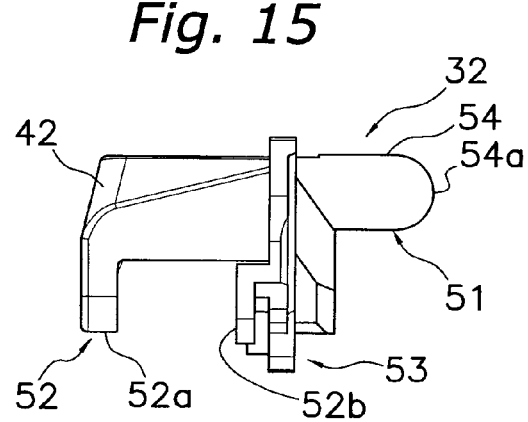
FIG. 17 is a top plan view of the motorized front derailleur mounting member illustrated in FIGS. 12-16.
Figure 18:
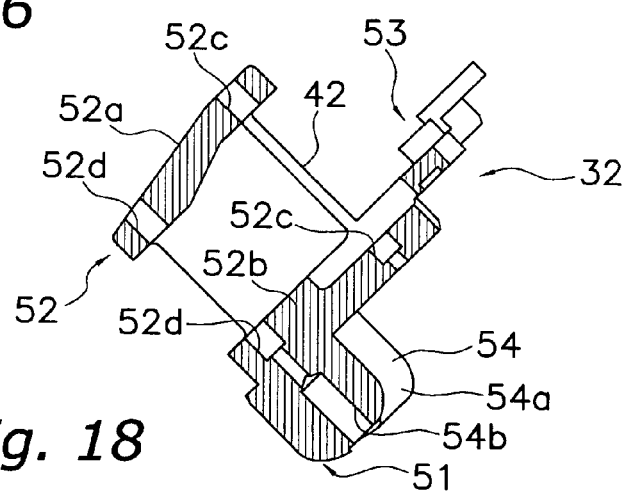
FIG. 18 is a cross-sectional view of the motorized front derailleur mounting member illustrated in FIGS. 12-17 as seen along section line 18-18 of FIG. 15.

As explained more detailed later, the motorized front derailleur assembly 12 is constructed to move between at least a below shift position as illustrated in FIGS. 1-6 and a top shift position as illustrated in FIGS. 7-10. Moreover, as illustrated in FIG. 11, the motor linkage 34 is designed with a derailleur protection arrangement such that the derailleur motor unit 33 can operated even though the motorized front derailleur unit 32 becomes jammed. The basic operation of shifting the chain 21 is relatively conventional, and thus, will not be illustrated shown in detail herein.

As best seen in FIGS. 1-11, the front derailleur unit 31 basically includes a chain guide 40, a derailleur linkage 41 and a fixing body 42 that is part of the mounting member 32, as explained below. The derailleur linkage 41 together with the chain guide 40 and the fixing body 42 preferably form a four-bar linkage that controls the lateral movement of the chain guide 40. The derailleur linkage 41 is configured and arranged to operatively couple between the fixing body 42 and the chain guide 40 for lateral movement of the chain guide 40 between at least a top shift position and a low shift position, i.e., at least first and second shift positions. More specifically, the chain guide 40 is movably coupled to the fixing body 42 by a derailleur linkage 41 that is operatively coupled to the motor linkage 34 to move the chain guide 40 between a first shift position and a second shift position in response to operation of front derailleur motor unit 33. This lateral movement of the chain guide 40 causes the chain 21 to be shift between the sprockets 22 and 23 of the bicycle drive train 24.

The chain guide 40 is preferably constructed of a hard rigid material. For example, the chain guide 40 is preferably constructed of a metal material such as a rigid sheet metal that is bent to the desired shape. As best seen in FIGS. 3, 4, 8 and 9, the chain guide 40 has first and second shifted pivot points $P_1$ and $P_2$, respectively, for pivotally securing the derailleur linkage 41 to the chain guide 40. In particular, pivot pins 43 and 44 pivotally couple the chain guide 40 to the derailleur linkage 41. The chain guide 40 has a chain receiving slot that is formed by a pair of vertical shift plates 40a and 40b. The vertical shift plates 40a and 40b are adapted to engage the chain 21 and thus move the chain 21 in a direction substantially transverse to the bicycle 10. The shift plates 40a and 40b are connected together by a pair of plates 40c and 40d. The upper plate 40c is integrally formed between the shift plates 40a and 40b. The lower plate 40d has one end that is integrally formed with the outer shift plate 40b and the other end that is attached to the inner shift plate 40a via a fastener, such as a screw or rivet.

The derailleur linkage 41 basically includes a first or outer link 45 and a second or inner link 46 with first ends pivotally, coupled to the fixing body 42 and with second ends pivotally coupled to the chain guide 40. Specifically, the first link 45 has a first end 45a pivotally coupled to a first fixed pivot point $P_3$ of the fixing body 42 by a pivot pin 47 and a second end 45b pivotally coupled to the first shifted pivot point $P_1$ of the chain guide 40 by the pivot pin 43. Similarly, the second link 46 has a first end 46a pivotally coupled to a second fixed pivot point $P_4$ of the fixing body 42 by a pivot pin 48 and a second end 46b pivotally coupled to the second shifted pivot point $P_2$ of the chain guide 40 by the pivot pin 44.

As apparent from the discussion above, the derailleur linkage 41 is preferably a four-bar linkage that is formed by the first or outer link 45, the second or inner link 46, the portion of the chain guide 40 extending between the first and second shifted pivot points $P_1$ and $P_2$, and the portion of the fixing body 42 extending between the first and second pivot fixed points $P_3$ and $P_4$. Thus, pivot axes of the pivot points $P_1$, $P_2$, $P_3$ and $P_4$ are all substantially parallel to each other.

When the derailleur linkage 41 holds the chain guide 40 in its extended most position, the chain guide 40 is located over the outermost sprocket 22, i.e., the furthest sprocket from the seat tube 16. When the derailleur linkage 41 holds the chain guide 40 in its retracted most position, the chain guide 40 is located over the innermost sprocket 23, i.e., the closet sprocket to the seat tube 16. These movements of the chain guide 40 and the derailleur linkage 41 are controlled by the shifting unit.

The first or outer link 45 includes two threaded holes 45c and 45d that receive a top position adjustment screw 49 and a low position adjustment screw 50. The two threaded holes 45c and 45d of the first or outer link 45 and the adjustment screws 49 and 50 form a mechanical adjustment device that finely adjusts the top and low positions of the chain guide 40. Thus, the mechanical adjustment device is configured and arranged to change the first and second shift positions of the chain guide 40 relative to the fixing body 42. In other words, the first or low adjustment screw 50 is configured and arranged to change the first or low shift position of the chain guide 40 relative to the fixing body 42, while the second or top adjustment screw 49 is configured and arranged to change the second or top shift position of the chain guide 40 relative to the fixing body 42. While the adjustment screws 49 and 50 are mounted on the first or outer link 45, it will be apparent from this disclosure that the adjustment screws 49 and 50 can be mounted on any one of the fixing body 42, the chain guide 40 and the links 45 and 46 with a free end of the adjustment screw contacting one of the fixing body 42, the chain guide 40 and the links 45 and 46 or the motor linkage 34 in which the adjustment screw is not threadedly coupled thereto. Also it will be apparent from this disclosure that an adjustment screw can be threadedly coupled to one of the motor linkage 34 and the derailleur linkage 41 with a free end of the adjustment screw contacting one of the motor linkage 34 and the derailleur linkage 41 in which the adjustment screw is not threadedly coupled thereto. In the illustrated embodiment, the first or low adjustment screw 50 is configured and arranged to change the first or low shift position of the chain guide 40 relative to the fixing body 42 by the free end of the low adjustment screw 50 contacting the fixing body 42, while the second or top adjustment screw 49 is configured and arranged to change the second or top shift position of the chain guide 40 relative to the fixing body 42 by the free end of the top adjustment screw 49 contacting the motor linkage 34 as explained below.

As best seen in FIGS. 12-18, the motorized front derailleur mounting member 32 basically includes a bicycle frame mounting portion 51, a front derailleur mounting portion 52 and a motor unit mounting portion 53. The bicycle frame mounting portion 51, the front derailleur mounting portion 52 and the motor unit mounting portion 53 are integrally formed as a one-piece, unitary member. The front derailleur mounting portion 52 and the motor unit mounting portion 53 form a derailleur motor support structure.

The bicycle frame mounting portion 51 is configured and arranged to be coupled to the seat tube 16 of the bicycle frame 14 by the bracket 18. The bicycle frame mounting portion 51 includes a projection 54 that projects outwardly from a first side of the motorized front derailleur mounting member 32 to a free end that forms a curved front surface 54a with a threaded hole 54b. The curved front surface 54a is configured and arranged to contact a corresponding curved portion of the bracket 18 such that the motorized front derailleur mounting member 32 can not rotated relative to the bracket 18. One of the fasteners or bolts 19 is threaded into the threaded hole 54b of the bicycle frame mounting portion 51, while the other two fasteners or bolts 19 are threaded into the threaded holes formed the seat tube 16 such that the motorized front derailleur mounting member 32 is secured to the bicycle frame 14 via the bracket 18.

Figure 8:
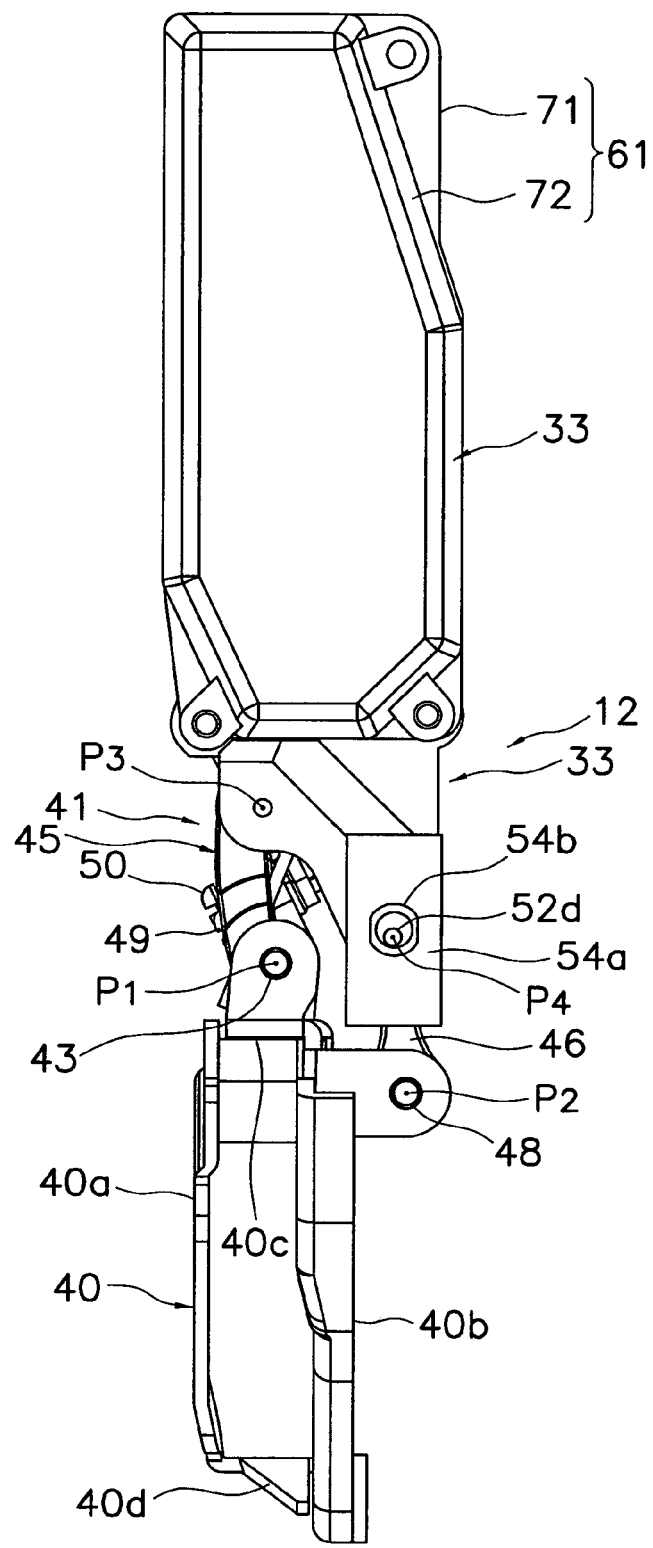
FIG. 8 is a front elevational view of the motorized front derailleur in the top shift position.
Figure 9:
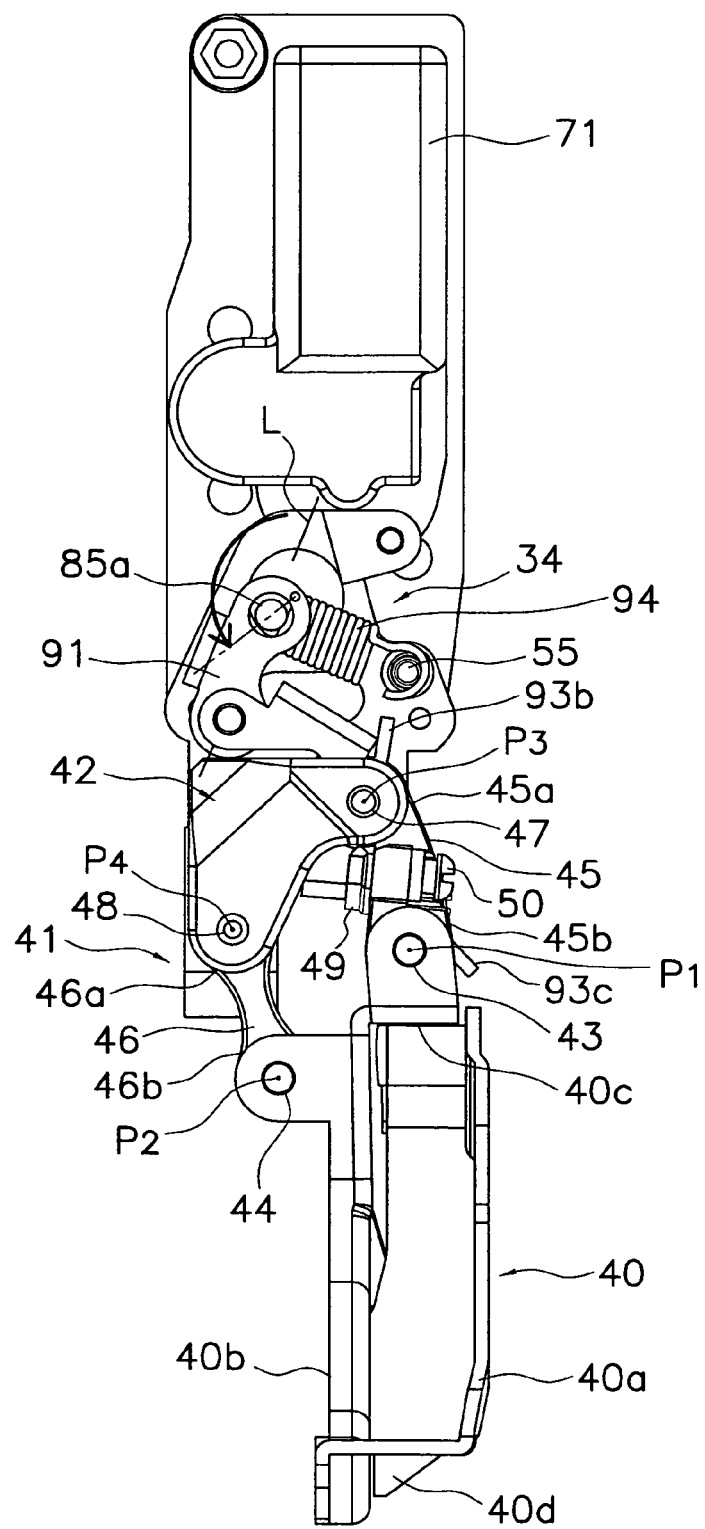
FIG. 9 is a rear elevational view of the motorized front derailleur in the top shift position.

The front derailleur mounting portion 52 is configured and arranged to be coupled to a derailleur linkage 41 of a front derailleur unit 31. In particular, the front derailleur mounting portion 52 has first and second link supporting parts 52a and 52b that are configured and arranged to define a link receiving space therebetween for receiving the first and second links 45 and 46. Thus, the first and second link supporting parts 52a and 52b are configured and arranged to form the front derailleur fixing body 42. The first and second link supporting parts 52a and 52b each include a first pivot pin mounting hole 52c forming the first pivot axis of the first fixed pivot point $P_3$ and a second pivot pin mounting hole 52d forming the second fixed pivot point $P_4$. The first and second link supporting parts 52a and 52b are configured and arranged such that the first and second link supporting parts 52a and 52b are spaced different at the first pivot pin mounting holes 52c than at the second pivot pin mounting holes 52d to accommodate the different sizes of the first and second links 45 and 46. The second pivot axis of the second fixed pivot point $P_4$ is substantially parallel to the first pivot axis of the first fixed pivot point $P_3$. The first pivot axis of the second pivot pin mounting holes 52d that defines the second fixed pivot point $P_4$ passes through the threaded hole 54b as best seen in FIG. 8.

The motor unit mounting portion 53 is configured and arranged to be coupled to the front derailleur motor unit 33. The motor unit mounting portion 53 includes a plurality (three) of threaded holes 53a that form a plurality mounting parts of the motor unit mounting portion 53. The motor unit mounting portion 53 also includes an output shaft cutout 53b that has a center axis that is substantially parallel to the pivot axes of the first and second fixed pivot points $P_3$ and $P_4$ of the front derailleur mounting portion 52. The output shaft cutout 53b of the motor unit mounting portion 53 is a hole surrounded by material of the motor unit mounting portion 53. The motor unit mounting portion 53 further includes a pin mounting hole 53c in which a spring mounting pin 55 is mounted.

Figures 36, 37:
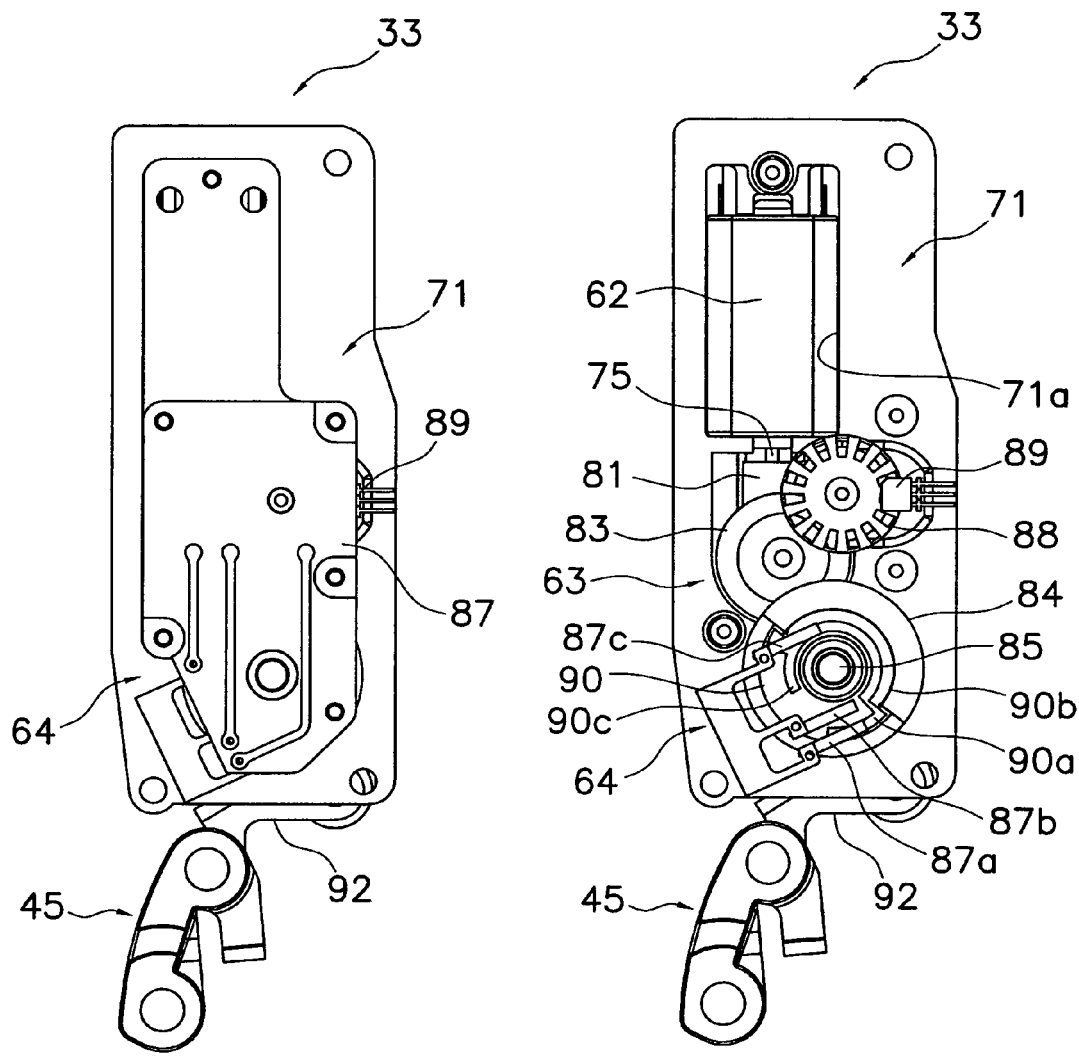
FIG. 36 is a front elevational view of the front derailleur motor unit with the cover removed.
FIG. 37 is a front elevational view of the motor unit with the cover and printed circuit board removed for purposes of illustration.

Referring now to FIGS. 2, 7, and 36-47, the front derailleur motor unit 33 basically includes a derailleur motor unit support structure 61 (FIGS. 2, 7, 36 and 39-47), a derailleur motor 62 (FIGS. 37 and 38), a motor drive train 63 (FIGS. 37 and 38), and a position control device 64 (FIGS. 36 and 37). The front derailleur motor unit 33 is mounted to the motor unit mounting portion 53 that forms a derailleur motor support. The front derailleur motor unit 33 is operatively coupled the chain guide 40 by the motor linkage 34 and the derailleur linkage 41. Thus, operation of the front derailleur motor unit 33 by the shifting unit 20 causes the chain guide 40 to be shifted between the low and top shift positions.

The derailleur motor unit support structure 61 basically includes a motor unit casing or housing 71 (FIGS. 39-43) and a motor unit cover 72 (FIGS. 44-47). The casing 71 and the cover 72 are configured and arranged to enclose and support the derailleur motor 62 and the motor drive train 63. Preferably, the casing 71 and the cover 72 are constructed of a rigid, lightweight material such as a hard plastic material.

Figure 38:
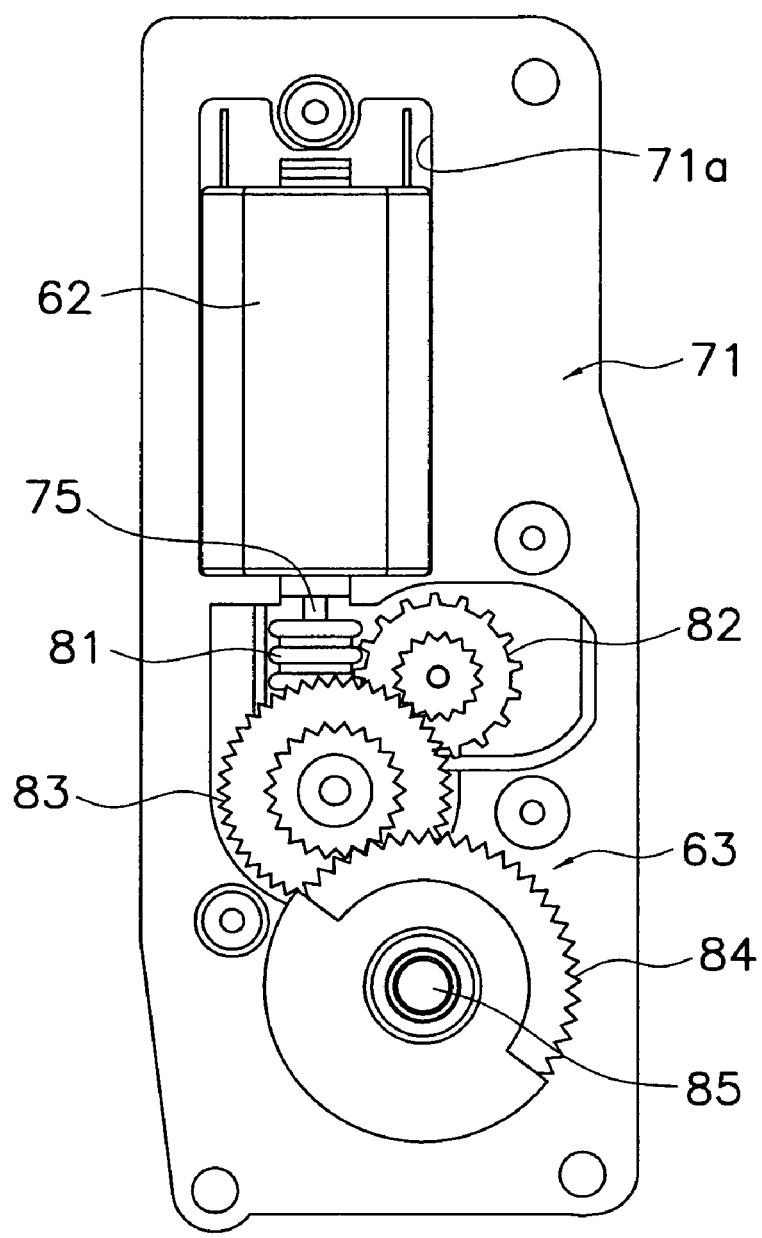
FIG. 38 is a front elevational view of the motor unit with the cover, the printed circuit board and the sensor wheel removed to illustrate the drive train of the front derailleur motor unit.
Figure 39:
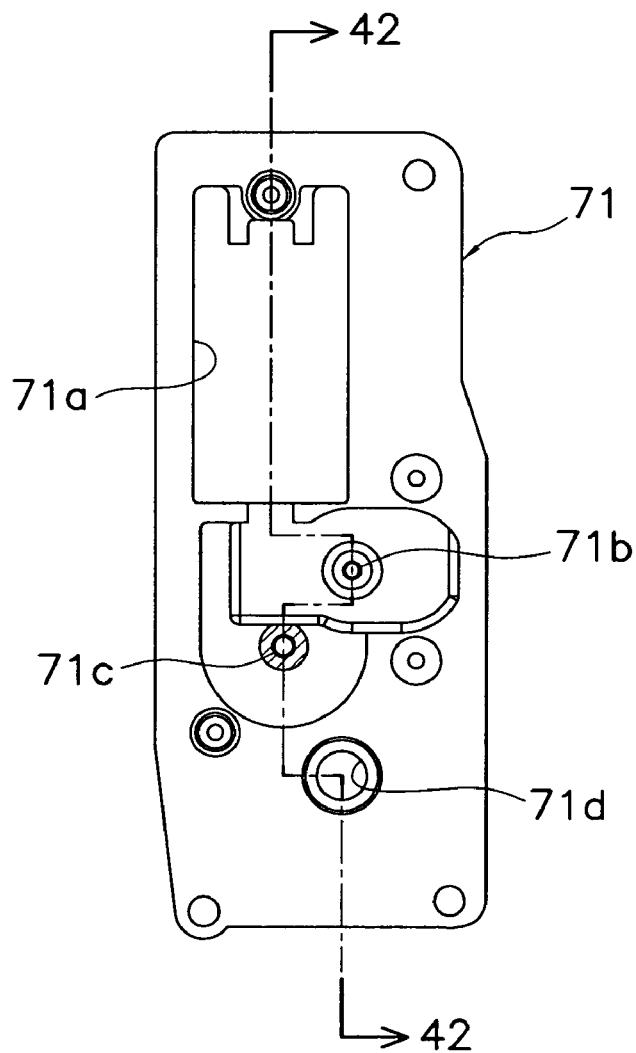
FIG. 39 is an inside elevational view of the motor casing or housing for the front derailleur motor unit.
Figure 40:
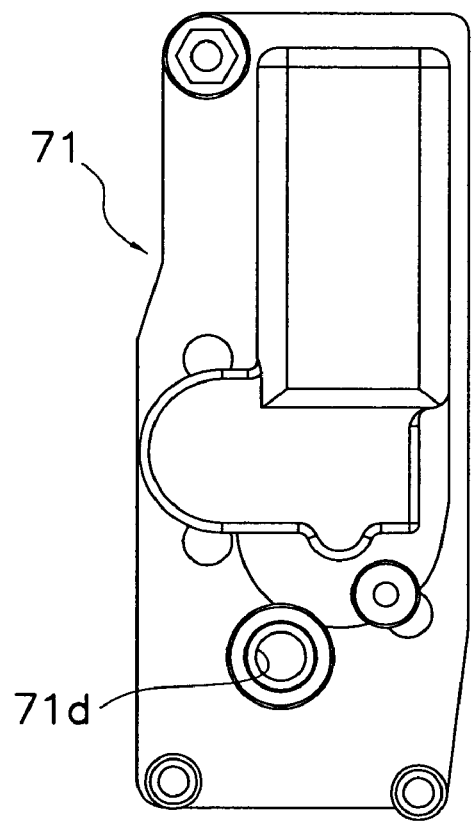
FIG. 40 is an outside elevational view of the casing or housing illustrated in FIG. 39 for the front derailleur motor unit.
Figure 44:
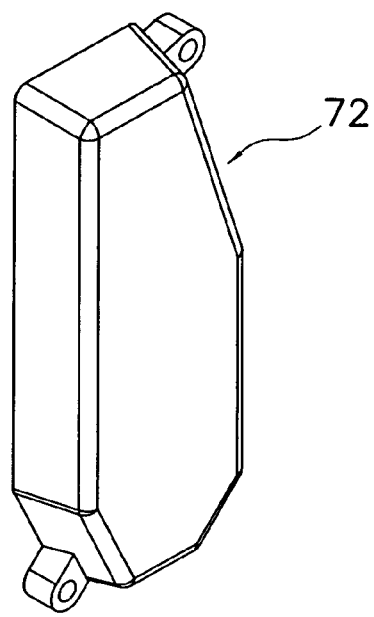
FIG. 44 is a front perspective view of the cover for the front derailleur motor unit.
Figure 45:
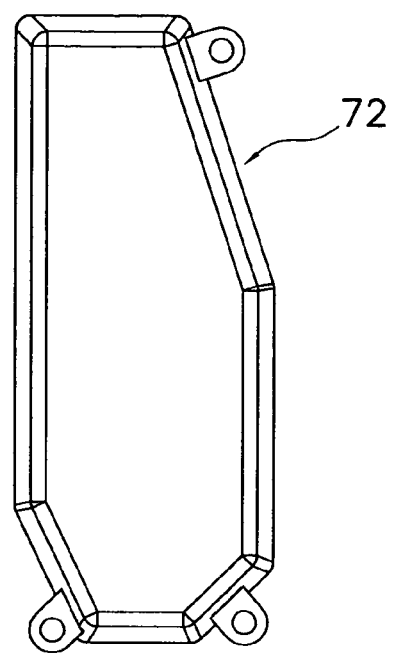
FIG. 45 is a front elevational view of the cover for the front derailleur motor unit illustrated in FIG. 44.
Figure 46:
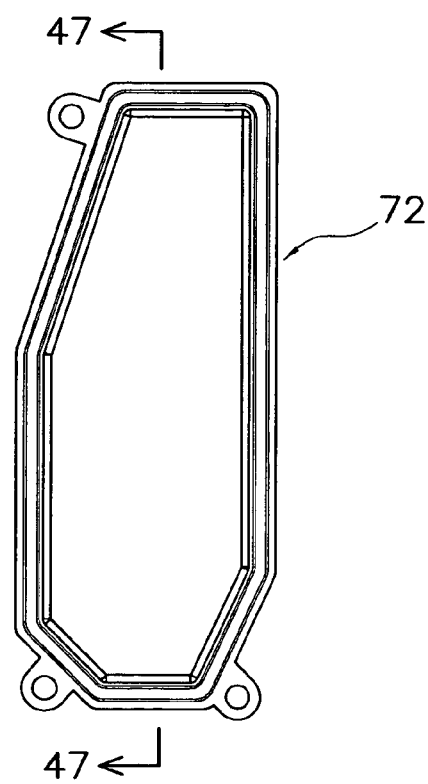
FIG. 46 is an inside elevational view of the cover for the front derailleur motor unit illustrated in FIGS. 44 and 45.
Figure 47:
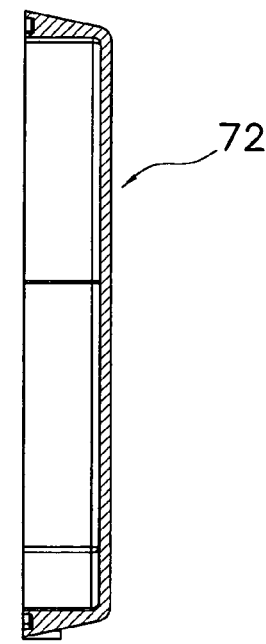
FIG. 47 is a cross-sectional view of the cover for the front derailleur motor unit.

As seen in FIGS. 37-39, the casing 71 includes a recess 71a for receiving and supporting the front derailleur motor unit 33 therein. The casing 71 also includes a pair of gear shaft supporting bores 71b and 71c and an output shaft hole 71d that are configured and arranged to support the motor drive train 63.

As seen in FIG. 38, the derailleur motor 62 is mounted to the casing 71 of the derailleur motor unit support structure 61. The derailleur motor 62 is a reversible electric motor that is powered by a battery source or a generator. The derailleur motor 62 is electrically coupled to the shifting unit 20 by an electrical cord and to a power source (battery source or generator) by another electrical cord. The derailleur motor 62 has a driving shaft 75 that is operatively coupled to the motor drive train 63. Reversible electric motors such as the derailleur motor 62 are well known. Thus, the derailleur motor 62 will not be discussed or illustrated in detail.

As seen in FIGS. 37 and 38, the motor drive train 63 basically includes a worm gear 81, a first intermediate gear 82, a second intermediate gear 83, and an output gear 84. The output gear 84 is mounted on an output shaft 85. The motor drive train 63 transmits rotational movement of the driving shaft 75 of the derailleur motor 62 to the motor linkage 34 via the output shaft 85. In particular, the worm gear 81 is mounted on the driving shaft 75 of the derailleur motor 62, with the spiral tooth of the worm gear 81 engaged with a first set of teeth of the first intermediate gear 82. The first intermediate gear 82 has a second set of teeth that engages a first set of teeth of the second intermediate gear 83, which in turn has a second set of teeth that engages the teeth of the output gear 84. The output gear 84 is mounted on the output shaft 85, which in turn is coupled to the motor linkage 34. Thus, the motor drive train 63 is disposes between the driving shaft 75 of the derailleur motor 62 and the output shaft 85.

As seen in FIG. 43, the output shaft 85 is rotatably supported in the output shaft hole 71d of the casing 71 by a bearing 86. Of course, it will be apparent from this disclosure that the bearing 86 can be mounted on the motorized derailleur mounting member 32 instead of the casing 71 such that the output shaft 85 is rotatably supported on the motorized derailleur mounting member 32. In any event, the output shaft 85 is configured and arranged to rotate about a rotational axis $A_1$ between a first rotational position and a second rotational position that is opposite the first rotational direction by rotation of the driving shaft 75 of the derailleur motor 62. The output shaft 85 includes an eccentric drive pin 85a having an axis $A_2$ that is offset from a rotational axis $A_1$ of the output shaft 85.

As seen in FIGS. 36 and 37, the position control device 64 basically includes a printed circuit board 87, a position sensor element 88, a photo interrupter 89 and a top-low brush sensor 90. The printed circuit board 87 has a plurality of electrical circuits formed thereon in a conventional manner for controlling the operation of the derailleur motor 62 via the shifting unit 20. More specifically, the printed circuit board 87 has an electrical contact plate with electrical contact brushes 87a, 87b and 87c coupled thereto in a cantilever fashion. These brushes 87a, 87b and 87c contact the top-low brush sensor 90 that is mounted to the output gear 84. In other words, the top-low brush center 90 rotates together with the output gear 84. The brushes 87a, 87b and 87c selectively contact three electrical contacts. In other words, the brushes 87a, 87b and 87c cooperate with the contacts 90a, 90b and 90c to complete electrical circuit that drives the derailleur motor 62 in either the first rotational direction or the second (opposite) rotational direction. The position of the output shaft in 85 is determined by utilizing the position sensor element 88 and the photo interpreter 89. The photo sensor element 88 is mounted on the faced intermediate gear 82 such that the position sensor 88 rotates therewith. The position sensor element 88 is provided with a plurality of circumstantially spaced apart openings that are detected by the photo interpreter 89. In other words, the photo interpreter 89 senses the openings in the position 88 to determine the relative position of the first intermediate gear 82. Since the position of the first intermediate gear 82 directly relates to the position of the output shaft 85, the position of the output shaft 85 can easily be determined. Thus, the shifting unit 20 can determine the position of the chain guide 20 based on the relative position of the first intermediate gear 82.

Referring back to FIGS. 1-11, the motor linkage 34 basically includes a drive or motor link 91, a saver link 92, a saver link biasing element 93 and a position biasing element 94. The saver link 92 and the saver link biasing element 93 form a jamming protection arrangement. The motor linkage 34 is operatively coupled between the eccentric drive pin 85a of the output shaft 85 and the derailleur linkage 41. This jamming protection arrangement is configured and arranged to move between a force transmitting state and a force override state.

Figure 23:
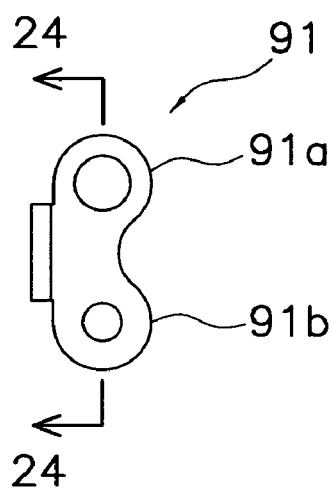
FIG. 23 is a rear elevational view of the motor link for the front derailleur illustrated in FIGS. 1-11 in accordance with the present invention.
Figure 24:
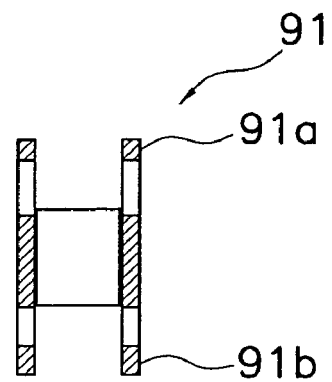
FIG. 24 is a longitudinal cross-sectional view of the motor link illustrated in FIG. 23 as seen along section line 24-24.
Figure 25:
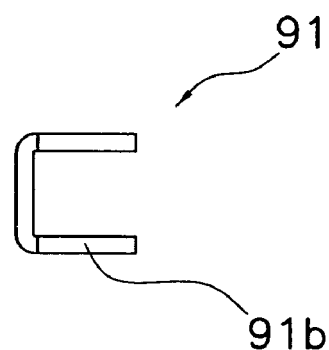
FIG. 25 is a top end elevational view of the motor link illustrated in FIGS. 23 and 24.

As seen in FIGS. 4, 6, 9, 10 and 11, the drive link 91 is configured and arranged relative to the output shaft 85 and the derailleur linkage 41 to shift the chain guide 40 between the first shift position and a second shift position. The drive link 91, as particularly seen in FIGS. 23-25, has a first drive link end 91a and a second drive link end 91b. The first drive link end 91a is mounted on the eccentric drive pin 85a of the output shaft 85 such that the eccentric drive pin 85a can rotate within the holes formed in the first drive link end 91a. The second drive link end 91b is pivotally coupled to the saver link 92 by a pivot pin 95. Thus, when the output shaft 85 is rotated, the drive link 91 is moved or shifted. The drive link 91 has a longitudinal axis L extending between the first and second drive link ends 91a and 91b. The longitudinal axis L of the drive link 91 has a first orientation (FIGS. 4 and 6) when the chain guide 40 is in the first shift position and a second orientation (FIGS. 9 and 10) when the chain guide 40 is in the second shift position with the first and second orientations of the longitudinal axis L of the drive link 91 being changed less than forty five degrees.

As best seen in FIGS. 26-29, the saver link 92 preferably has a first saver link end 92a, a second saver link end 92b and a control or stop flange 92c. The first saver link end 91a of the saver link 92 is pivotally coupled to the second drive link end 91b of the drive link 91 by the pivot pin 95. The second saver link end 92b is operatively coupled to the first or outer link 45 of the derailleur linkage 41. The control or stop flange 92c extends from the second saver link end 92b and is arranged to contact the top adjustment screw 49 when the motor linkage 34 is driven to the top shift position as seen in FIG. 10. Thus, the second or top adjustment screw 49 is configured and arranged to change the second or top shift position of the chain guide 40 relative to the fixing body 42 by the free end of the top adjustment screw 49 contacting the control or stop flange 92c of the saver link 92.

In adjusting the front derailleur unit 31, the front derailleur unit 31 is mounted to the frame 12 by the motorized front derailleur mounting member 32 and bracket 18. Then the top shift position is set by adjusting the top adjustment screw 49 so that the chain guide 40 is disposed over the front chain wheel 22. This adjustment of the top shift position causes the relative orientation between the outer link 46 and the saver link 92 to change. In particular, the adjusting of the top adjustment screw 49 changes the relative orientation between the outer link 46 and the saver link 92 by counteracting the urging force of the saver link biasing element 93, i.e., compressing the saver link biasing element 93. Once the top shift position has been set, the low shift position is also changed by the adjusting of the top adjustment screw 49 because the chain guide 40 moves with the outer link 46. Thus, the low position is next set by using the low adjustment screw 50, which contacts the fixing body 4, such that the chain guide 40 is disposed over the smaller front chain wheel 23. In other words, the adjusting of the low adjustment screw 50 changes the relative orientation between the outer link 46 and the saver link 92 when the chain guide 40 is disposed over the front chain wheel 23 by further counteracting the urging force of the saver link biasing element 93, i.e., further compressing the saver link biasing element 93.

Figures 30, 31:
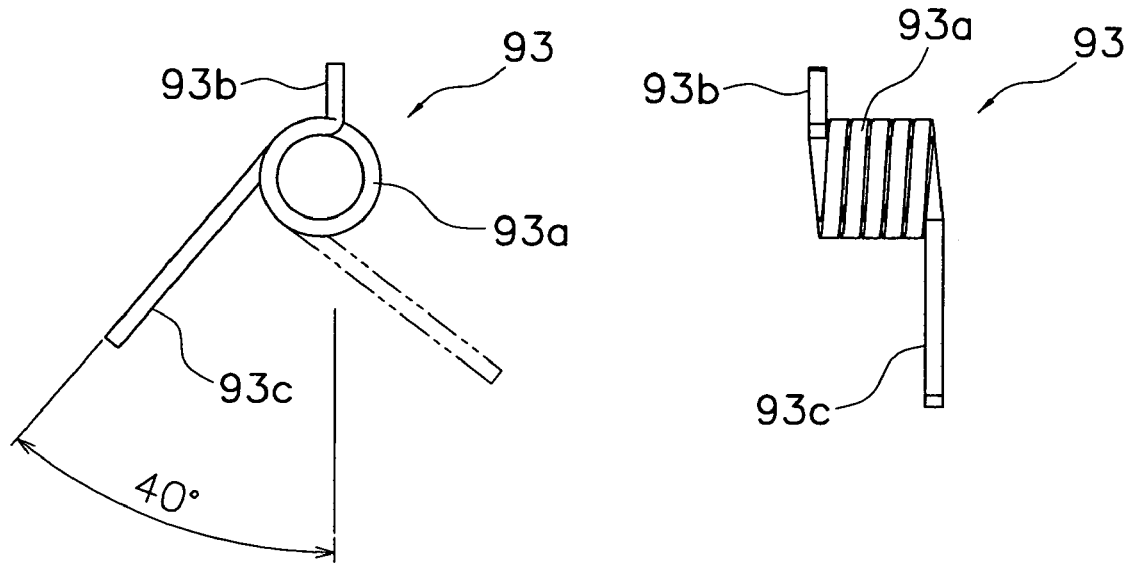
FIG. 30 is a side elevational view of the saver spring for the front derailleur illustrated in FIGS. 1-11 in accordance with the present invention.
FIG. 31 is an elevational view of the saver spring illustrated in FIG. 30.
Figures 32, 33:
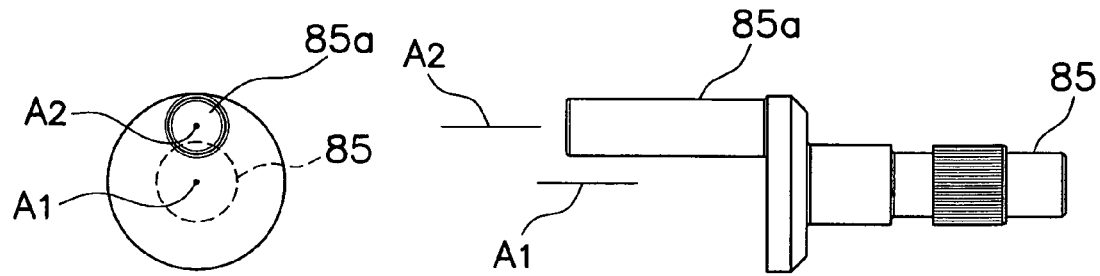
FIG. 32 is an axial view of the output shaft for the front derailleur illustrated in FIGS. 1-11 in accordance with the present invention.
FIG. 33 is a side view of the output shaft illustrated in FIG. 32.
Figure 34:
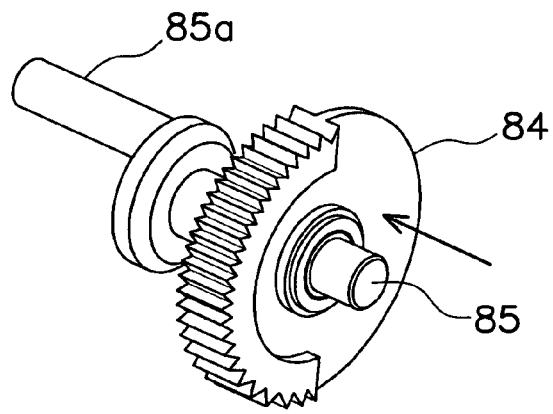
FIG. 34 is a perspective view of the output shaft with the output gear mounted thereto in accordance with the present invention.
Figure 35:
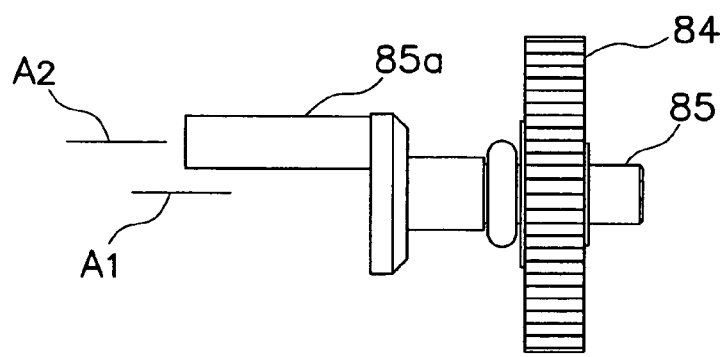
FIG. 35 is a side elevational view of the output shaft with the output shaft gear mounted thereto.

As best seen in FIGS. 30 and 31, the saver link biasing element 93 is preferably a torsion spring having a coiled portion 93a, a first leg portion 93b and a second leg portion 93c. The coiled portion 93a is located about the pivot pin 47 that connects the saver link 92 to the first or outer link 45. The first leg portion 93b of the saver link biasing element 93 engages the saver link 92, while the second leg portion 93b contacts the first or outer link 45 of the derailleur linkage 41. Thus, the saver link 92 is biased in a counter clockwise direction about pivot pin 47 as viewed from the rear of the derailleur. Likewise, the first or outer link 45 is also biased in a counterclockwise direction about the pivot pin 47 as viewed from the rear of the derailleur. In other words, the saver link biasing element 93 is configured and arranged to apply an urge force that normally maintains a substantially rigid connection between the drive link 91 and the derailleur linkage 41. Accordingly, the saver link 92 is pivotally coupled to the derailleur linkage 41 and the saver link biasing element 93 is operatively coupled between the saver link 92 and the derailleur linkage 41 to urge the saver link 92 from the force override state to the force transmitting state such that a substantially rigid connection is normally maintained between the saver link and the derailleur linkage 41.

Thus, as seen in FIG. 11, if the chain guide 40 is stuck in the top position, and the motor linkage 34 is driven by the output shaft 85 to a low shift position, the saver link 92 will rotate in a clockwise direction in about the pivot pin 47 as viewed from the rear of the derailleur against the urging force the first leg portion 93b of the saver link biasing element 93. Thus, a non rigid connection is formed between the saver link 92 and the derailleur linkage 41 by utilizing the saver link 92 and the saver link biasing element 93. In other words, the saver link 92 and the saver link biasing element 93 form a non-rigid connection that connects a second drive link end 91b of the drive link 91 to the derailleur linkage 41. This non-rigid connection forms the jamming protection arrangement.

The position biasing element 94 is preferably a tension spring that has a first end coupled to the eccentric drive pin 85a and a second end connected to the spring mounting pin 55 of the motor unit mounting portion 53. The position biasing element 94 is configured and arranged such that the urging force of the position biasing element 94 holds the motor linkage 34 in either the top position or the low position. In other words, when the motor linkage 34 is in the top position, the line of force of the position biasing element 94 is offset from the rotational axis $A_1$ of the output shaft 85 to apply a clockwise force on the output shaft 85 as viewed from the rear of the derailleur. However, when the motor linkage 34 moved to the low position, the line of force of the position biasing element 94 is such that a counterclockwise force is applied to the output shaft 85. Accordingly, the position biasing element 94 is configured and arranged to insist assist in the holding chain guide 40 in either the top or low position when the motor is no longer energized.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A motorized bicycle front derailleur assembly comprising:
    a motor unit having an output shaft being configured and arranged to rotate between a first rotational position and a second rotational position;
    a front derailleur operatively coupled to the output shaft, the front derailleur including a fixing body, a chain guide, and a derailleur linkage operatively coupled between the fixing body and the chain guide; and
    a motor linkage coupled between the output shaft and the derailleur linkage to move the chain guide between a first shift position corresponding to the first rotational position and a second shift position corresponding to the second rotational position in response to rotation of the output shaft,
    the motor linkage including a jamming protection arrangement that is configured and arranged with respect to the derailleur linkage to move between a force transmitting state in which the motor linkage forms a rigid force transmitting connection to move the chain guide and a force override state in which the motor linkage forms a non-rigid force overriding connection due to a jamming force being transmitted by the derailleur linkage to the motor linkage such that the motor can rotate to the first rotational position from the second rotational position when the chain guide is jammed in the second shift position.

2. The motorized bicycle front derailleur assembly according to claim 1 wherein
    the front derailleur further includes a mechanical adjustment device configured and arranged to change at least one of first and second shift positions of the chain guide relative to the fixing body.

3. The motorized bicycle front derailleur assembly according to claim 2, wherein
    the mechanical adjustment device is configured and arranged to change both of the first and second shift positions of the chain guide relative to the fixing body.

4. The motorized bicycle front derailleur assembly according to claim 2, wherein
    the mechanical adjustment device includes a first adjustment screw configured and arranged to change the first shift position of the chain guide relative to the fixing body.

5. The motorized bicycle front derailleur assembly according to claim 4, wherein
    the mechanical adjustment device further includes a second adjustment screw configured and arranged to change the second shift position of the chain guide relative to the fixing body.

6. The motorized bicycle front derailleur assembly according to claim 2, wherein
    the mechanical adjustment device includes an adjustment screw threadedly coupled to one of the fixing body, the chain guide and the derailleur linkage with a free end of the adjustment screw contacting one of the fixing body, the chain guide and the derailleur linkage in which the adjustment screw is not threadedly coupled thereto.

7. The motorized bicycle front derailleur assembly according to claim 2, wherein
    the output shaft includes an eccentric drive pin that is offset from a rotational axis of the output shaft.

8. The motorized bicycle front derailleur assembly according to claim 1, wherein
    the motor unit further includes a motor with a driving shall and a drive train coupled between of the driving shaft and the output shaft.

9. The motorized bicycle front derailleur assembly according to claim 8, wherein
    the output shaft is configured and arranged to an eccentric drive pin that is offset from a rotational axis of the output shaft.

10. A motorized bicycle front derailleur assembly comprising:
    a motor unit having an output shaft being configured and arranged to rotate between a first rotational position and a second rotational position;
    a front derailleur operatively coupled to the output shaft, the front derailleur including a fixing body, a chain guide, and a derailleur linkage operatively coupled between the fixing body and the chain guide; and
    a motor linkage operatively coupled between the output shaft and the derailleur linkage to move the chain guide in response to rotation of the output shaft, the output shaft including an eccentric drive pin that is offset from a rotational axis of the output shaft,
    the motor linkage including a jamming protection arrangement that is configured and arranged to move between a force transmitting state and a force override state.

11. The motorized bicycle front derailleur assembly according to claim 10, wherein
    the front derailleur further includes a mechanical adjustment device configured and arranged to change at least one of first and second shift positions of the chain guide relative to the fixing body.

12. The motorized bicycle front derailleur assembly according to claim 10, wherein
    the motor unit further includes a motor with a driving shaft and a drive train coupled between of the driving shaft and the output shaft.

13. A motorized bicycle front derailleur assembly comprising:
    motor unit having an output shaft being configured and arranged to rotate between a first rotational position and a second rotational position;

a front derailleur operatively coupled to the output shaft, the front derailleur including a fixing body, a chain guide, and a derailleur linkage operatively coupled between the fixing body and the chain guide; and a motor linkage operatively coupled between the output shaft and the derailleur linkage to move the chain guide in response to rotation of the output shaft, the motor linkage including a jamming protection arrangement that is configured and arranged to move between a force transmitting state and a force override state, the jamming protection arrangement including a saver link pivotally coupled to the derailleur linkage and a biasing element operatively coupled between the saver link and the derailleur linkage to urge the saver link from the force override state to the force transmitting state such that a substantially rigid connection is normally maintained between the saver link and the derailleur linkage.

14. The motorized bicycle front derailleur assembly according to claim 13, wherein the biasing element is a torsion spring having a coiled portion located about a pivot axis formed between the saver link and the derailleur linkage.

15. The motorized bicycle front derailleur assembly according to claim 13, wherein the motor linkage Thither includes a drive link pivotally coupled between the saver link and the output shaft.

16. The motorized bicycle front derailleur assembly according to claim 15 wherein the output shaft includes an eccentric drive pin that is offset from a rotational axis of the output shaft.

17. The motorized bicycle front derailleur assembly according to claim 15, wherein the front derailleur further includes a mechanical adjustment device configured and arranged to change at least one of first and second shift positions of the chain guide relative to the fixing body.

18. The motorized bicycle front derailleur assembly according to claim 17, wherein the mechanical adjustment device is configured and arranged to change both of the first and second shift positions of the chain guide relative to the fixing body.

19. The motorized bicycle front derailleur assembly according to claim 18, wherein the mechanical adjustment device includes a first adjustment screw configured and arranged to change the first shift position of the chain guide relative to the fixing body.

20. The motorized bicycle front derailleur assembly according to claim 19, wherein the mechanical adjustment device further includes a second adjustment screw configured and arranged to change the second shift position of the chain guide relative to the fixing body.

21. A motorized bicycle front derailleur assembly comprising:

a motor unit having an output shaft being configured and arranged to rotate between a first rotational position and a second rotational position;

a front derailleur operatively coupled to the output shaft, the front derailleur including a fixing body, a chain guide, and a derailleur linkage operatively coupled between the fixing body and the chain guide;

a motor linkage operatively coupled between the output shaft and the derailleur linkage to move the chain guide in response to rotation of the output shaft; and a mechanical adjustment device configured and arranged to change at least one of first and second shift positions of the chain guide relative to the fixing body, the mechanical adjustment device including an adjustment screw threadedly coupled to one of the motor linkage and the derailleur linkage with a free end of the adjustment screw contacting one of the motor linkage and the derailleur linkage in which first adjustment screw is not threadedly coupled thereto, the motor linkage including a jamming protection arrangement that is configured and arranged to move between a force transmitting state and a force override state.

* * * * *